United States Patent
Anthony

(10) Patent No.: US 11,520,346 B2
(45) Date of Patent: *Dec. 6, 2022

(54) NAVIGATING AUTONOMOUS VEHICLES BASED ON MODULATION OF A WORLD MODEL REPRESENTING TRAFFIC ENTITIES

(71) Applicant: Perceptive Automata, Inc., Boston, MA (US)

(72) Inventor: Samuel English Anthony, Somerville, MA (US)

(73) Assignee: Perceptive Automata, Inc., Boston, MA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/777,673

(22) Filed: Jan. 30, 2020

(65) Prior Publication Data
US 2020/0239026 A1    Jul. 30, 2020

Related U.S. Application Data

(60) Provisional application No. 62/822,269, filed on Mar. 22, 2019, provisional application No. 62/800,416, (Continued)

(51) Int. Cl.
  *G05D 1/02*   (2020.01)
  *B60W 30/095*   (2012.01)
  (Continued)

(52) U.S. Cl.
  CPC .......... *G05D 1/0221* (2013.01); *B60W 30/09* (2013.01); *B60W 30/095* (2013.01);
  (Continued)

(58) Field of Classification Search
  None
  See application file for complete search history.

(56) References Cited

U.S. PATENT DOCUMENTS 7,269,516 B2    9/2007    Brunner et al.
8,175,333 B2    5/2012    Eaton et al.
(Continued)

OTHER PUBLICATIONS

Matti et al., "Combining LiDAR Space Clustering and Convolutional Neural Networks for Pedestrian Detection", 2017 14th IEEE International Conference on Advanced Video and Signal Based Surveillance (Year: 2017).*

(Continued)

*Primary Examiner* — Tamara L Weber
(74) *Attorney, Agent, or Firm* — Fenwick & West LLP

(57) ABSTRACT

An autonomous vehicle uses machine learning based models to predict hidden context attributes associated with traffic entities. The system uses the hidden context to predict behavior of people near a vehicle in a way that more closely resembles how human drivers would judge the behavior. The system determines an activation threshold value for a braking system of the autonomous vehicle based on the hidden context. The system modifies a world model based on the hidden context predicted by the machine learning based model. The autonomous vehicle is safely navigated, such that the vehicle stays at least a threshold distance away from traffic entities.

23 Claims, 17 Drawing Sheets

Related U.S. Application Data filed on Feb. 1, 2019, provisional application No. 62/798,978, filed on Jan. 30, 2019.

(51) Int. Cl.

| | | |
|---|---|---|
| *G05D 1/00* | (2006.01) | |
| *B60W 40/09* | (2012.01) | |
| *G06N 20/00* | (2019.01) | |
| *B60W 30/09* | (2012.01) | |
| *B60W 60/00* | (2020.01) | |

(52) U.S. Cl.
CPC ........ *B60W 40/09* (2013.01); *B60W 60/0015* (2020.02); *B60W 60/0027* (2020.02); *G05D 1/0088* (2013.01); *G05D 1/0214* (2013.01); *G05D 1/0231* (2013.01); *G06N 20/00* (2019.01); *B60W 2420/42* (2013.01); *B60W 2420/52* (2013.01); *B60W 2554/40* (2020.02); *G05D 2201/0213* (2013.01)

(56) References Cited

U.S. PATENT DOCUMENTS

| | | | |
|---|---|---|---|
| 9,415,777 | B2 | 8/2016 | Clarke et al. |
| 9,766,336 | B2 | 9/2017 | Gupta et al. |
| 2011/0210866 | A1 | 9/2011 | David et al. |
| 2015/0210280 | A1 | 7/2015 | Agnew et al. |
| 2016/0355181 | A1 | 12/2016 | Morales Teraoka et al. |
| 2017/0131719 | A1 | 5/2017 | Micks et al. |
| 2017/0153639 | A1 | 6/2017 | Stein |
| 2017/0318360 | A1* | 11/2017 | Tran ................. B33Y 80/00 |
| 2017/0329332 | A1 | 11/2017 | Pilarski et al. |
| 2018/0374359 | A1 | 12/2018 | Li et al. |
| 2019/0107840 | A1 | 4/2019 | Green et al. |
| 2019/0122037 | A1 | 4/2019 | Russell et al. |
| 2019/0187720 | A1 | 6/2019 | Fowe |
| 2019/0359205 | A1 | 11/2019 | Xu et al. |
| 2020/0167954 | A1 | 5/2020 | Wallin et al. |
| 2020/0193829 | A1* | 6/2020 | Cheng ................. G08G 1/162 |

OTHER PUBLICATIONS

Lipson et al., "Driverless: Intelligent Cars and the Road Ahead", Massachusetts Institute of Technology, 2016, p. 177-180 (Year: 2016).*

International Search Report and Written Opinion, Patent Cooperation Treaty Application No. PCT/US2020/15889, dated Jun. 16, 2020, 23 pages.

Invitation to Pay Additional Fees, Patent Cooperation Treaty Application No. PCT/US2020/15889, dated Apr. 13, 2020, 2 pages.

First Examination Report, Indian Patent Application No. 202147039120, dated Apr. 13, 2022, 6 pages.

United States Office Action, U.S. Appl. No. 16/777,386, dated Dec. 23, 2021, 49 pages.

* cited by examiner

NAVIGATING AUTONOMOUS VEHICLES BASED ON MODULATION OF A WORLD MODEL REPRESENTING TRAFFIC ENTITIES

CROSS REFERENCE TO RELATED APPLICATIONS

This application claims the benefits of priority under 35 USC 119(e) to U.S. Provisional Application No. 62/798,978 filed on Jan. 30, 2019, U.S. Provisional Application No. 62/800,416 filed on Feb. 1, 2019, and U.S. Provisional Application No. 62/822,269 filed on Mar. 22, 2019, each of which is incorporated herein by reference in its entirety for all purposes.

GOVERNMENT SUPPORT STATEMENT

This invention was made with government support under Award No. 1738479 awarded by National Science Foundation's Division of Industrial Innovation and Partnerships (IIP). The government has certain rights in the invention.

TECHNICAL FIELD

The present disclosure relates generally navigating an autonomous vehicle through traffic and more specifically to routing of an autonomous vehicle through traffic based on modulation of a world model representing traffic entities.

BACKGROUND

An autonomous vehicle uses different types of sensors to receive input describing the surroundings (or environment) of the autonomous vehicle while driving through traffic. For example, an autonomous vehicle may perceive the surroundings using camera images and lidar scans. The autonomous vehicle determines whether an object in the surroundings is stationary, for example, buildings or trees or the object is non-stationary, for example, a pedestrian, a vehicle, and so on. The autonomous vehicle system predicts the motion of non-stationary objects to make sure that the autonomous vehicle is able to navigate through non-stationary obstacles in the traffic.

Conventional systems predict motion of pedestrians and other vehicles to determine whether they are likely to come in the path of the autonomous vehicle. The autonomous vehicle navigates through traffic so as to avoid collisions with any pedestrians or other vehicles. However, conventional techniques fail to accurately predict motion of certain non-stationary objects for example, pedestrians, bicyclists, and so on. For example, if the autonomous vehicle detects a pedestrian standing in a street corner, the motion of the pedestrian does not help predict whether the pedestrian will cross the street or whether the pedestrian will remain standing on a street corner. Similarly, if the autonomous vehicle detects a bicyclist in a lane, the current motion of the bicycle does not help the autonomous vehicle predict whether the bicycle will change lanes.

Failure of autonomous vehicles to accurately predict motion of non-stationary traffic objects results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

SUMMARY

Embodiments of the invention predict hidden context attributes associated with traffic entities that determine behavior of these traffic entities in the traffic. The traffic entities represent non-stationary objects in the traffic in which the autonomous vehicle is driving, for example, a pedestrian, a bicycle, a vehicle, a delivery robot, and so on. Hidden context includes factors that affect the behavior of such traffic entities, for example, a state of mind of a user represented by a traffic entity such as a pedestrian. A hidden context may represent a task that a user represented by the traffic entity is planning on accomplishing, for example, crossing the street or stepping on to the street to pick up some object. The hidden context may represent a degree of awareness of the autonomous vehicle by a user represented by the traffic entity. An example of a degree of awareness of the existence of the autonomous vehicle in the vicinity is whether a bicyclist is aware of the existence of the autonomous vehicle in the proximity of the bicyclist. The bicyclist may navigate the bicycle differently depending on the degree of awareness of the existence of the autonomous vehicle in the vicinity. The system uses the hidden context to predict behavior of people near a vehicle in a way that more closely resembles how human drivers would judge the behavior. The hidden context may represent a goal of a user represented by the traffic entity, wherein the user expects to achieve the goal within a threshold time interval. For example, the goal may represent crossing the street to reach the other side of the street within the next few seconds.

In one embodiment, a group of users (or human observers) view sample images of traffic entities near streets and/or vehicles and indicate or are measured for their understanding of how they believe the people will behave. These indicators or measurements are then used as a component for training a machine learning based model that predicts how people will behave in a real-world context. The machine learning based model is trained based on the reactions of human observers to sample images in a training environment. The trained machine learning based model predicts behavior of traffic entities in a real-world environment, for example, actual pedestrian behavior in traffic as a vehicle navigates through the traffic.

According to an embodiment, an autonomous vehicle identifies traffic entities, for example, based on the sensor data. For each traffic entity, motion parameters describing movement of the traffic entity are determined. A hidden context is determined based on a machine learning based model. The machine learning based model is trained based on feedback received from users responsive to presenting images or videos showing traffic scenarios to the users. The autonomous vehicle is navigated based on the motion parameters and the hidden context of each of the traffic entities.

According to an embodiment, an autonomous vehicle receives sensor data from sensors mounted on the autonomous vehicle. Traffic entities from the traffic are identified based on the sensor data. For each of traffic entity, a hidden context is determined based on a machine learning based model. The machine learning based model is trained based on feedback received from users presented with images or videos showing traffic scenarios. The output of the machine learning based model comprises a measure of statistical distribution of the hidden context. An activation threshold value is determined for a braking system of the autonomous vehicle based on the measure of statistical distribution of the hidden context. A prediction is made that the autonomous vehicle is likely to reach within the activation threshold of a particular traffic entity within a threshold time interval. Responsive to determining that the autonomous vehicle is likely to reach within the activation threshold of the particular traffic entity within the threshold time interval, the braking system of the autonomous vehicle is activated.

In an embodiment, the activation threshold value for the braking system of the autonomous vehicle has a value inversely proportionate to the degree of uncertainty in determining the hidden context.

In an embodiment, the activation threshold value for braking system of the autonomous vehicle is determined based on the distribution of the hidden context. Accordingly, a measure of kurtosis of the output distribution of the hidden context is determined. The activation threshold value for braking system of the autonomous vehicle is determined to be a value inversely proportionate to the measure of kurtosis of the output distribution of the hidden context.

According to another embodiment, an autonomous vehicle modifies a world model based on the hidden context predicted by a machine learning based model. A point cloud representation of the surroundings of an autonomous vehicle is generated, for example, based on sensor data obtained by sensors of the autonomous vehicle. Traffic entities are identified based on the sensor data. For each traffic entity, motion parameters describing movement of the traffic entity are determined. A hidden context is predicted using a machine learning based model trained based on feedback received from users presented with images or videos showing traffic scenarios. A region of the point cloud where the traffic entity is expected to reach within a threshold time interval is determined. The region is modified based on the hidden context. The autonomous vehicle is navigated so that the autonomous vehicle stays at least a threshold distance away from the modified region of each traffic entity.

In an embodiment, the region is in the direction determined based on a motion vector of the traffic entity. The region is modified based on the hidden context as follows. If a determination is made that the hidden context indicates that the user represented by the traffic entity is likely to move in the direction having a component along the motion vector, the region is extended along the direction of the motion vector. If a determination is made that the hidden context indicates that the user represented by the traffic entity is likely to move in a direction having a component opposite to direction of the motion vector, the size of the region is decreased along the direction of the motion vector.

In an embodiment, the autonomous vehicle is navigated by generating signals for controlling the autonomous vehicle based on the motion parameters and the hidden context of each of the traffic entities. The generated signals are sent to controls of the autonomous vehicle.

The sensor data may represent images captured by cameras mounted on the autonomous vehicle or lidar scans captured by a lidar mounted on the autonomous vehicle.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
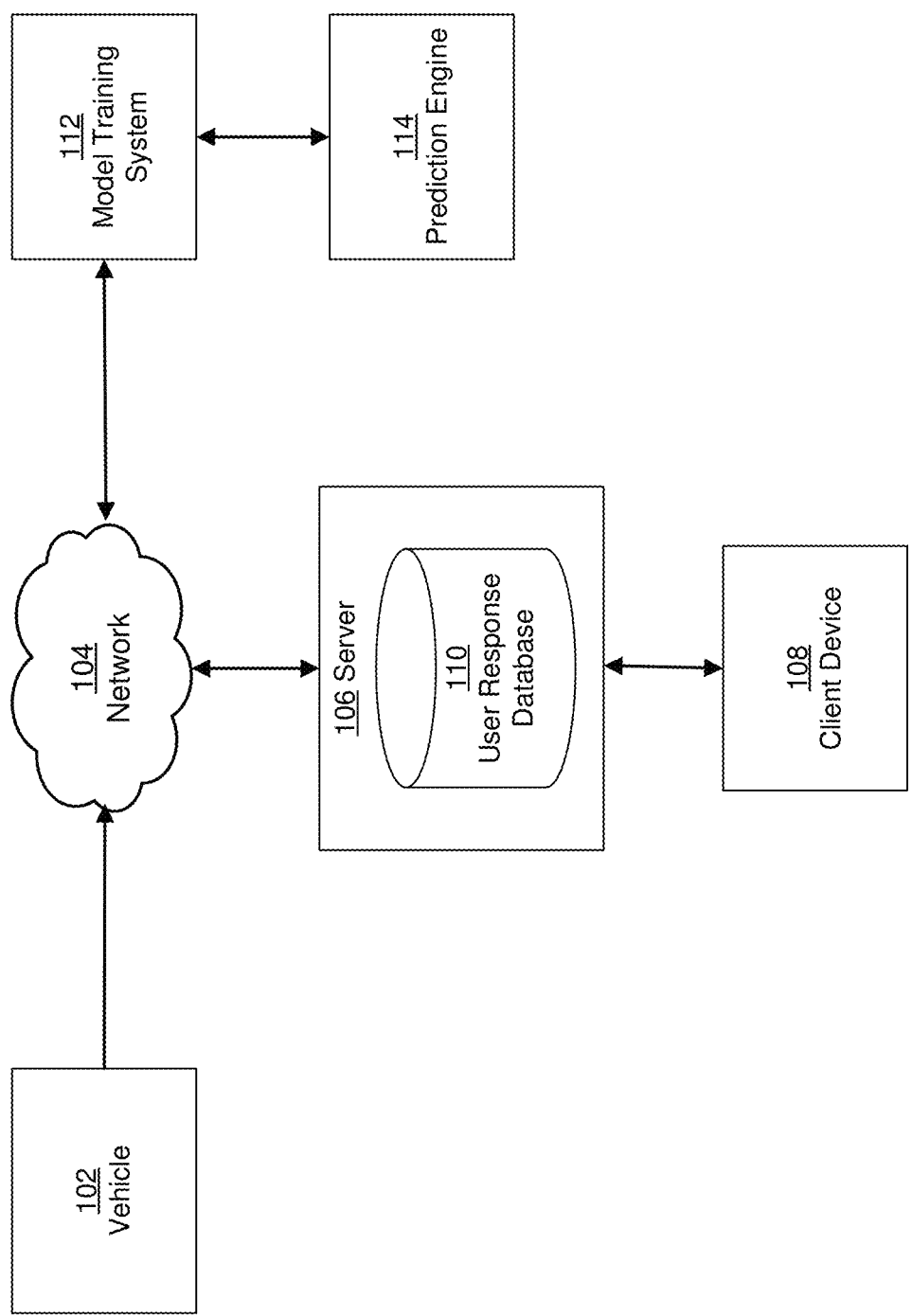
FIG. 1 is a system diagram of a networked system for predicting human behavior according to some embodiments of the invention.

Determining a Stable Signal for Predicting Behavior of Traffic Entities

A pedestrian consumes information about the world that the pedestrian is walking in. The sensory apparatus of a traffic entity, for example, a pedestrian ingests many gigabytes of information about the world. This information is converted into a vast range of inferential judgments. Those judgments are used to update and execute moment-by-moment motion plans that propel the pedestrian through the traffic, and allow it to reach the pedestrian's target.

A human brain is able to negotiate complex situations with many contingent factors. This flexibility and capacity that makes human behavior very difficult to model using a computer. Even given a consistent goal structure the complexity of predicting human inference scales with the complexity of the inputs to the human perceptual system. In a complex environments, such as a pedestrian navigating a busy intersection, the number of perceptual inputs with high valence to moment-by-moment motion planning is extremely large. At any time the pedestrians actions at the next moment are influenced by many hundreds of different aspects of the scene. These can include moving agents, contextual cues, distractions, fixed obstacles, newly noticed scene aspects, and the internal process of reflection. Because of this, predicting the behavior of a pedestrian at any time that is not extremely close to the present is intractable. Even with a complete world model, the number of possible actions at, say, one second from the present moment are subject to a combinatorial explosion.

Embodiments of the invention extract a stable signal of potential behavior of a traffic entity, for example, pedestrian that is not subject to the combinatorial explosion of inputs. In one embodiment, this stable signal is used to modulate the performance envelope of a vehicle under full or partial automatic control. In another embodiment, this stable signal is used to inform the human operator of a vehicle that the behavior of upcoming road users may require their attention.

In an embodiment, the stable signal is a computational model of the mental state of the pedestrian. Humans look at other humans and with a high degree of reliability and make estimates of their internal mental states as they apply to behavior. Embodiments of the invention train a model by leveraging indirect but highly reliable measurements of human theory of mind reasoning. This allows the model to make predictions about the internal mental states of others.

Embodiments of the invention predict an internal mental state of a pedestrian as a stable signal. The internal mental state of a pedestrian comprises a goal-oriented planning and evaluation system with short and long-term memory. A pedestrian on the sidewalk has come to occupy the sidewalk in pursuance of a specific goal (for example, to get to the other side). This goal has a duration that is (in general) far longer than the amount of time in which a computing system of an automatic vehicle would have to consider that pedestrian's state of mind. If a pedestrian has the goal of eventually reaching a destination on the other side of the street down which the vehicle in question is traveling, that goal will obtain until they have reached that destination. This goal will not generally be changed by transient conditions like the appearance of a "do not walk" sign. However, the likelihood that the pedestrian steps into the street at any given moment is very contingent on that transient condition. Embodiments of the invention predict estimates of state of mind, which aim to predict the internal goal and belief structure of the pedestrian, are therefore not subject to the combinatorial explosion of contingent factors.

A non-stationary object may also be referred to as a movable object. An object in the traffic may also be referred to as an entity. Systems for predicting human interactions with vehicles are disclosed in U.S. patent application Ser. No. 15/830,549, filed on Dec. 4, 2017 which is incorporated herein by reference in its entirety.

System Environment

FIG. 1 is a system diagram of a networked system for predicting human behavior according to some embodiments of the invention. FIG. 1 shows a vehicle 102, a network 104, a server 106, a user response database 110, a client device 108, a model training system 112 and a prediction engine 114.

The vehicle 102 can be any type of manual or motorized vehicle such as a car, bus, train, scooter, or bicycle. As described in more detail below, the vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114.

The server 106 can be any type of computer system capable of (1) hosting information (such as image, video and text information) and delivering it to a user terminal (such as client device 108), (2) recording responses of multiple users (or human observers) to the information, and (3) delivering such information and accompanying responses (such as responses input via client device 108) back to the network 104.

The user response database 110 can be any type of database or data storage system capable of storing the image, video, and text information and associated user responses and subsequently recalling them in response to a query.

The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

The prediction engine 114 can be implemented in any computing system. In an illustrative example, the prediction engine 114 includes process that executes a model that has been trained by the model training system 112. This process estimates a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

Figure 2:
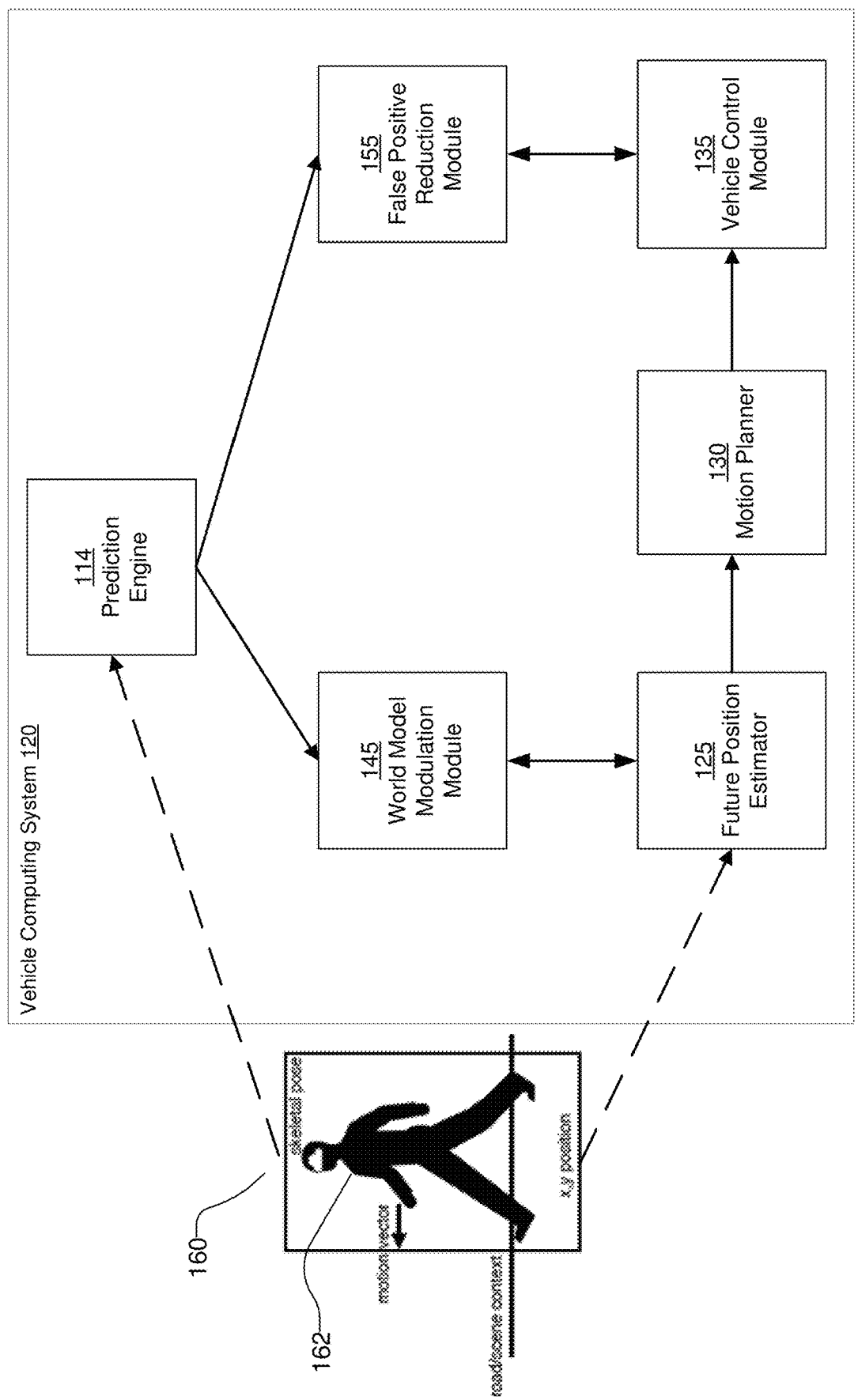
FIG. 2 is the system architecture of a vehicle computing system that routes an autonomous vehicle based on prediction of hidden context associated with traffic objects according to an embodiment of the invention.

FIG. 2 is the system architecture of a vehicle computing system that routes an autonomous vehicle based on prediction of hidden context associated with traffic objects according to an embodiment of the invention. The vehicle computing system 120 comprises the prediction engine 114, a future position estimator 125, a motion planner 130, a vehicle control module 135, a world model modulation module 145, and a false positive reduction module 155. Other embodiments may include more or fewer modules than those shown in FIG. 2. Actions performed by a particular module as indicated herein may be performed by other modules than those indicated herein.

The sensors of an autonomous vehicle capture sensor data 160 representing a scene describing the traffic surrounding the autonomous vehicle. Examples of sensors used by an autonomous vehicle include cameras, lidars, GNSS (global navigation satellite system such as a global positioning system, or GPS), IMU (inertial measurement unit), and so on. Examples of sensor data includes camera images and lidar scans.

The traffic includes one or more traffic entities, for example, a pedestrian 162. The vehicle computing system 120 analyzes the sensor data 160 and identifies various traffic entities in the scene, for example, pedestrians, bicyclists, other vehicles, and so on. The vehicle computing system 120 determines various parameters associated with the traffic entity, for example, the location (represented as x and y coordinates), a motion vector describing the movement of the traffic entity, and so on. For example, a vehicle computing system 120 may collect data of a person's current and past movements, determine a motion vector of the person at a current time based on these movements, and extrapolate a future motion vector representing the person's predicted motion at a future time based on the current motion vector.

The future position estimator 125 estimates the future position of a traffic entity. The motion planner 130 determines a plan for the motion of the autonomous vehicle. The vehicle control module 135 sends signals to the vehicle controls (for example, accelerator, brakes, steering, emergency braking system, and so on) to control the movement of the autonomous vehicle. In an embodiment, the future position estimates for a traffic entity determined by the future position estimator 125 based on sensor data 160 are provided as input to the motion planner 130. The motion planner 130 determines a plan for navigating the autonomous vehicle through traffic, and provides a description of the plan to the vehicle control module 135. The vehicle control module 135 generates signals for providing to the vehicle controls. For example, the vehicle control module 135 may send control signals to an emergency braking system to stop the vehicle suddenly while driving, the vehicle control module 135 may send control signals to the accelerator to increase or decrease the speed of the vehicle, or the vehicle control module 135 may send control signals to the steering of the autonomous vehicle to change the direction in which the autonomous vehicle is moving.

Figure 3:
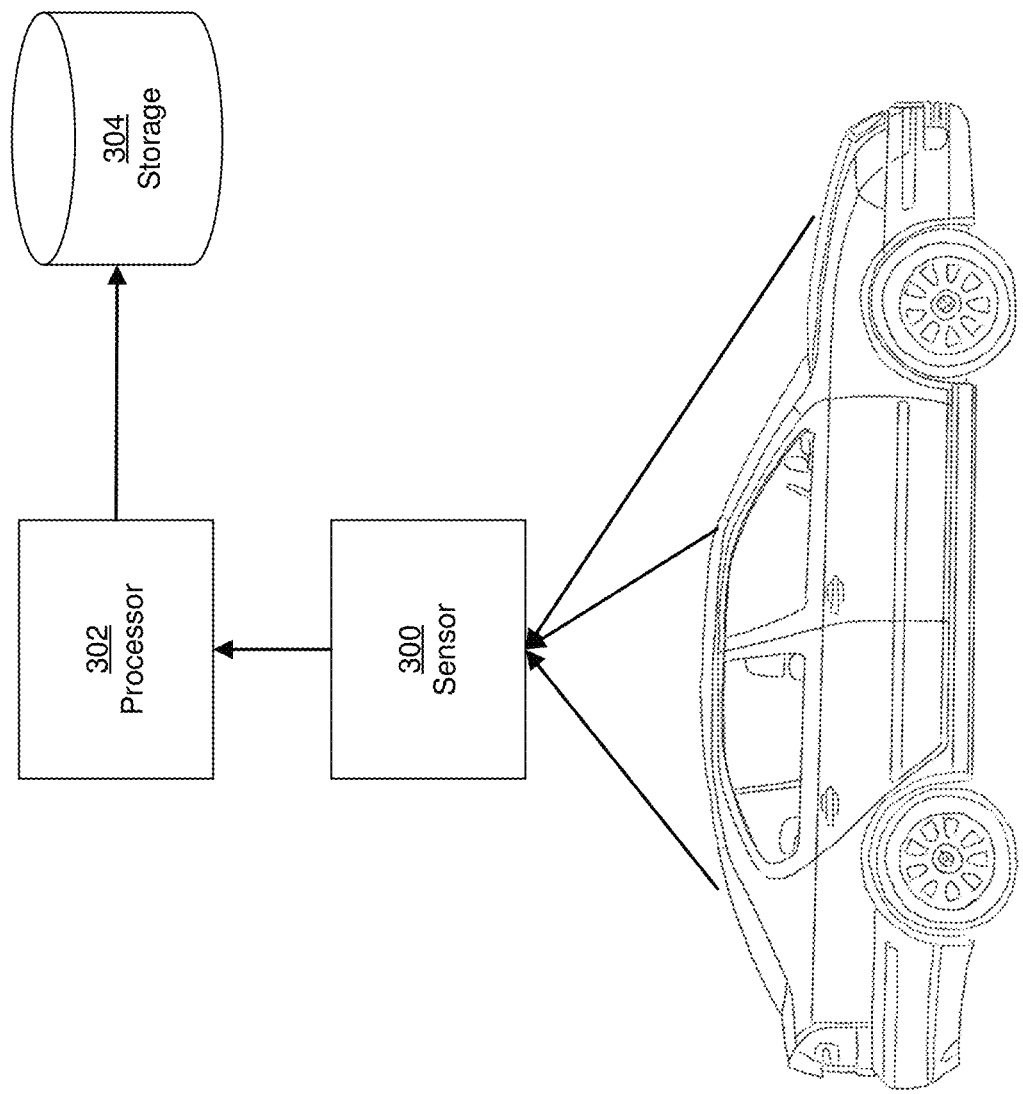
FIG. 3 is a system diagram showing a sensor system associated with a vehicle, according to some embodiments of the invention.

FIG. 3 is a system diagram showing a sensor system associated with a vehicle, according to some embodiments of the invention. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

In some embodiments, data in the remote storage 304 also includes database tables associated with the sensor data. When sensor data is received, a row can be added to a database table that records information about the sensor data that was recorded, including where it was recorded, by whom, on what date, how long the segment is, where the physical files can be found either on the internet or on local storage, what the resolution of the sensor data is, what type of sensor it was recorded on, the position of the sensor, and other characteristics.

Figure 4:
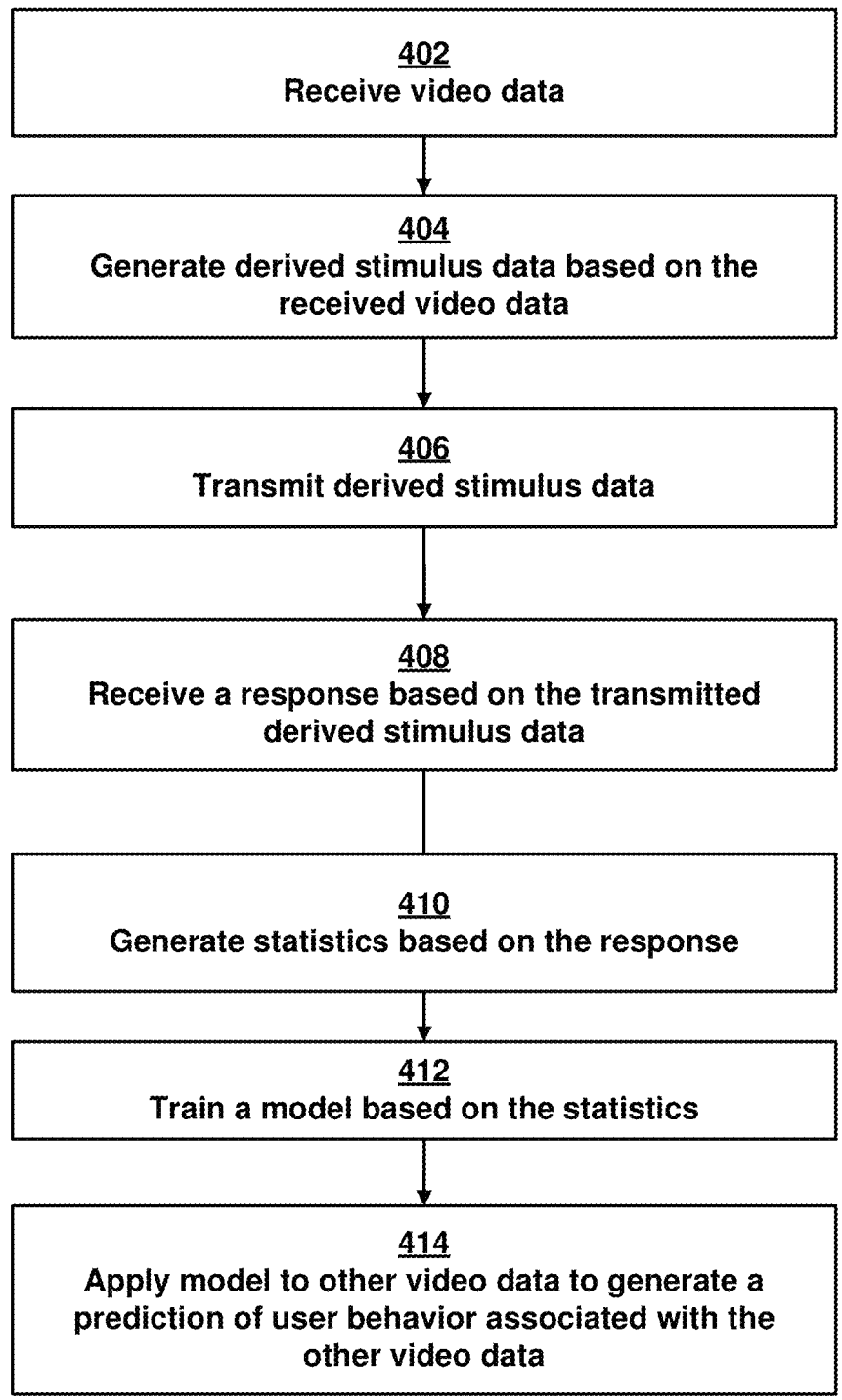
FIG. 4 is a flowchart showing a process of training a machine learning based model to predict hidden context information describing traffic entities, according to some embodiments of the invention.

FIG. 4 is a flow chart showing a process of predicting human behavior, according to some embodiments of the invention. In one implementation, video or other data is captured by a camera or sensor mounted on the vehicle 102. The camera or other sensor can be mounted in a fixed or temporary manner to the vehicle 102. Of course, the camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 402, this video or other data captured by the camera or other sensor is transmitted from the vehicle 102, over the network 104, and to the server 106 where it is stored.

Then, in step 404, video frames or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 214 and in the text accompanying FIG. 9, as part of the training process for the prediction algorithm, human observers view the derived stimulus and predict how they believe the humans shown in the derived stimulus will act. In yet a further implementation, after the video frames or segments are extracted from the stored data, the derived stimulus is generated by manipulating the pixels or equivalent array data acquired from the camera or other sensor in step 204, producing a new data file that conveys a portion of the information from the original video with certain aspects highlighted or obscured.

In step 406, the derived stimulus is transmitted from the server 106 and displayed to a large number of users (or human observers) on the client device 108 (or multiple client devices 108). The client devices(s) 108 prompt the human observers to predict how the people shown in the derived stimulus will act, and upon viewing the displayed stimulus, the observers input their responses corresponding to their predictions. For example, the human observers may predict that a bicyclist will continue riding, whether a first person in the stimulus will cross the street, whether another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the client devices(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 408, the derived stimulus and associated human observer responses are transmitted from the client device(s) 108 to the server 106 and recorded in the user response database 110.

In step 410, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 412, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a bounding box drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 414, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

The server 106 generates derived stimuli from raw camera or sensor data of the vehicle for presenting to human observers. As described above, sensor data can include video segments or specific frames. These frames can either be contiguous or non-contiguous, and can be in the original order, in a permuted order, in reverse order, or in random order. Some of the frames can be repeated once or more than once.

Some of the frames may be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian. Frames may be recombined to form a derived stimulus. In some embodiments, if there is only one frame, that frame comprises the derived stimulus. If there is more than one frame those frames may then be recombined.

Predictions and other information is collected from human observers based on derived stimuli. Human observers are given detailed instructions about how to answer questions about derived stimuli. Those observers are presented with derived stimuli and asked to answer questions about them. The observers respond to the stimuli and those responses are recorded. The recorded responses are aggregated and logged in a database, for example, the user response database 110.

Human observers are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations. For example, if human observers are asked to judge the intention of a pedestrian to walk in front of a car, the instructions may be: "In this test, we want you to pretend you're driving a car. You'll see road scenes with cyclists highlighted, and you'll have to decide what they're planning to do. Try to answer as quickly as you can."

The human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment.

The judgment that the human observer makes is a hidden context attribute that may represent an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver" is definitely attentive" or "the other driver is definitely not attentive".

The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

The explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

The responses are aggregated and recorded in a data structure, such as the user response database 110. This data structure is then sent as a text field to a networked computer system running database software and logged in a database.

Figure 6:
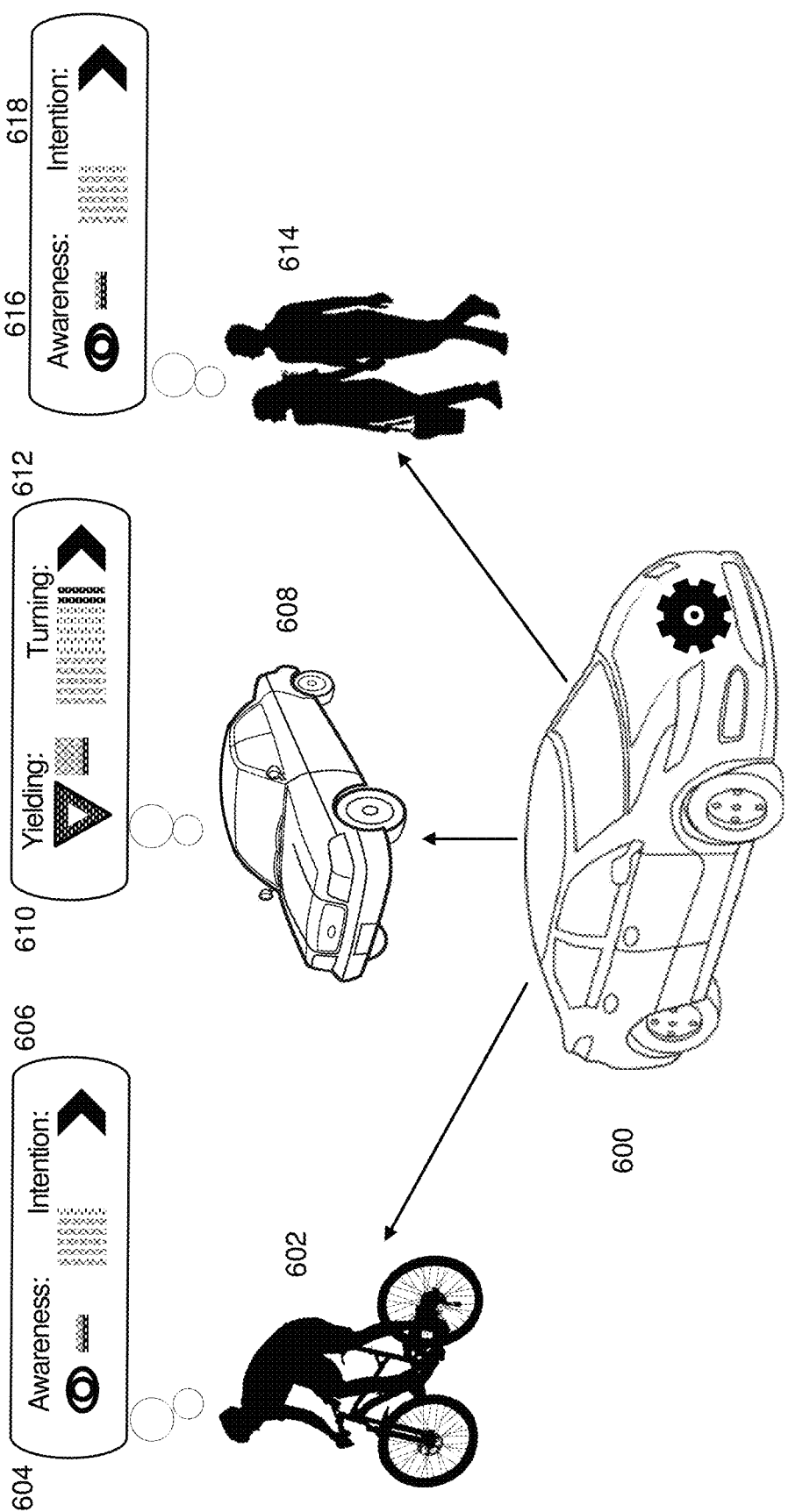
FIG. 6 is a diagram showing an example of an application of a context user prediction process in an automobile context, according to some embodiments of the invention.

For each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

An amount of time associated with a subject responding to the derived stimulus may also be recorded. In some embodiments, this time is associated with the overall reliability of the human observer's rating. For example, a response associated with a lower response time may be weighted higher and a response associated with a slower response time may be weighted lower.

Summary statistics of a video frame or derived stimulus is generated. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above. The calculated summary statistics are linked to the video frame or sensor data frame associated with the responses from which they were calculated.

The summary statistics is used for training machine learning based models. The machine learning based model may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

In one embodiment of the model training system 112, the machine learning based model can be a deep neural network. In this embodiment the parameters are the weights attached to the connections between the artificial neurons comprising the network. Pixel data from an image in a training set collated with human observer summary statistics serves as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set. At the end of this process the model is "trained", which in some embodiments, means that the difference between the summary statistics output by the neural network and the summary statistics calculated from the responses of the human observers is minimized.

Figure 5:
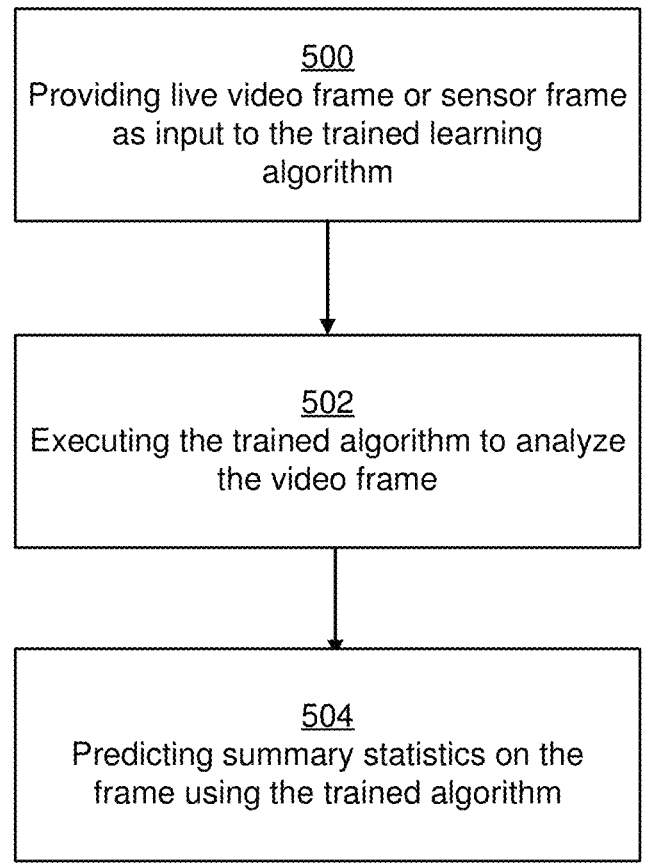
FIG. 5 is a flowchart showing a process of predicting the state of mind of road users using a trained learning algorithm, according to some embodiments of the invention.

FIG. 5. is a flowchart showing a process of predicting the state of mind of road users using a trained learning algorithm, according to some embodiments of the invention. In step 500, the training algorithm receives a "real world" or "live data" video or sensor frame. Then in step 502, the trained algorithm analyzes the frame, thus enabling the algorithm in step 504 to output a prediction of summary statistics on the frame.

The "real world" or "live data" video or other sensor frames from a car-mounted sensor are delivered to the trained learning algorithm in step 500. These frames have the same resolution, color depth and file format as the frames used to train the algorithm. These frames are delivered as individual frames or as sequences according to the format used to train the original algorithm.

Each of these frames is analyzed by being passed through the trained model in step 502. In one embodiment, the data from the frame that was passed through the model would comprise the pixel data from a camera. This data would be transformed by a trained artificial neural network. At the final stage of the processing in the artificial network, it would produce an output. This output is the model output in step 504.

The model outputs a number or set of numbers that comprise the predicted summary statistics for the "real world" or "live data" image in step 504. The predicted summary statistics are the model's best estimation of what the summary statistics would be on the image if the image had human annotations collected. The prediction is generated automatically by passing the sensor data through the model, where the information is transformed by the internal mechanisms of the model according to the parameters that were set in the training process shown in step 804. Because these summary statistics characterize the distribution of human responses that predict the state of mind of a road user pictured in the stimulus, the predicted statistics are therefore a prediction of the aggregate judgment of human observers of the state of mind of the pictured road user and thus an indirect prediction of the actual state of mind of the road user.

FIG. 6 is a diagram showing an example of an application of a context user prediction process in an automobile context, according to some embodiments of the invention. In this example intention 606 618 means that the road user 602 614 has the goal of moving into the path of the vehicle 600 before the vehicle 600 (on which the system is mounted) reaches their position. Awareness 604 616 in this example means that the road user 602 614 understands that the vehicle on which the system is mounted 600 is present in their vicinity. In this example, when cyclist 602 rides into the field of view of a camera mounted on vehicle 600, the pixel data of the camera image of the cyclist is fed to a trained machine learning based model as described above in step 900. The trained machine learning based model analyzes the image as described above in step 902. The trained machine learning based model predicts summary statistics as in step 904. These summary statistics are an estimate of what the summary statistics would be for a collection of human observers who were shown a derived stimulus of the camera data as in step 504. The estimates summary statistics are therefore the system's best answer to the question "does this cyclist intend to enter the path of the vehicle." The vehicle is therefore able to make a guess 606 about the intention of the cyclist that is closely matched to the guess that a human driver would make in that same situation. In this example, the intention of the cyclist 606 is relatively high, as indicated by the number of horizontal bars in the display. The system installed on an automobile 600 also makes predictions about the awareness 604 of cyclists of the vehicle 600, by the same method described for intention. It also makes predictions about the willingness of an automobile 608 to yield 610 or its desire to turn across the system-containing vehicle's path 612 by the same method described above. In the case of the automobile the questions that human subjects answered that would be predicted by the algorithm are "would the vehicle be willing to yield" 610 and "does the vehicle wish to turn across your path" 612. It also makes predictions about the likelihood of pedestrians 614 to cross in front of the vehicle 618, and whether those pedestrians are aware of the vehicle 616, by the same method described above.

The models described above may be implemented as a real-time module that makes predictions of behavior of traffic entities based on input from cameras or other sensors installed on a car 600. In the case of an autonomous car, these predictions may be used to make inferences about the intent of road users such as cyclists 602, other motorists 608, and pedestrians 614 to cross into the path of the car, as well as whether the road users are aware of the car and its future path. They can also be used to predict whether other road users would be surprised, welcoming, or aggressively unwelcoming if the car were to engage in maneuvers which would take it into the path of another road user (e.g., would an oncoming car yield if the car implementing the systems and methods described herein were to turn left).

Navigating Autonomous Vehicle Based on Hidden Context

The vehicle computing system 120 predicts hidden context representing intentions and future plans of a traffic entity (e.g., a pedestrian or a bicyclist). The hidden context may represent a state of mind of a person represented by the traffic entity. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the person about the autonomous vehicle, for example, whether a bicyclist driving in front of the autonomous vehicle is likely to be aware that the autonomous vehicle is behind the bicycle.

The hidden context may be used for navigating the autonomous vehicle, for example, by adjusting the path planning of the autonomous vehicle based on the hidden context. The vehicle computing system 120 may improve the path planning by taking a machine learning based model that predicts the hidden context representing a level of human uncertainty about the future actions of pedestrians and cyclists and uses that as an input into the autonomous vehicle's motion planner. The training dataset of the machine learning models includes information about the ground truth of the world obtained from one or more computer vision models. The vehicle computing system 120 may use the output of the prediction engine 114 to generate a probabilistic map of the risk of encountering an obstacle given different possible motion vectors at the next time step. Alternatively, the vehicle computing system 120 may use the output of the prediction engine 114 to determine a motion plan which incorporates the probabilistic uncertainty of the human assessment.

In an embodiment, the prediction engine 114 determines a metric representing a degree of uncertainty in human assessment of the near-term goal of a pedestrian or any user representing a traffic entity. The specific form of the representation of uncertainty is a model output that is in the form of a probability distribution, capturing the expected distributional characteristics of user responses of the hidden context of traffic entities responsive to the users being presented with videos/images representing traffic situations. The model output may comprise summary statistics of hidden context, i.e., the central tendency representing the mean likelihood that a person will act in a certain way and one or more parameters including the variance, kurtosis, skew, heteroskedasticity, and multimodality of the predicted human distribution. These summary statistics represent information about the level of human uncertainty.

In an embodiment, the vehicle computing system 120 represents the hidden context as a vector of values, each value representing a parameter, for example, a likelihood that a person represented by a traffic entity is going to cross the street in front of the autonomous vehicle, a degree of awareness of the presence of autonomous vehicle in the mind of a person represented by a traffic entity, and so on.

Overall Process of Navigating an Autonomous Vehicle Through Traffic

Figure 7:
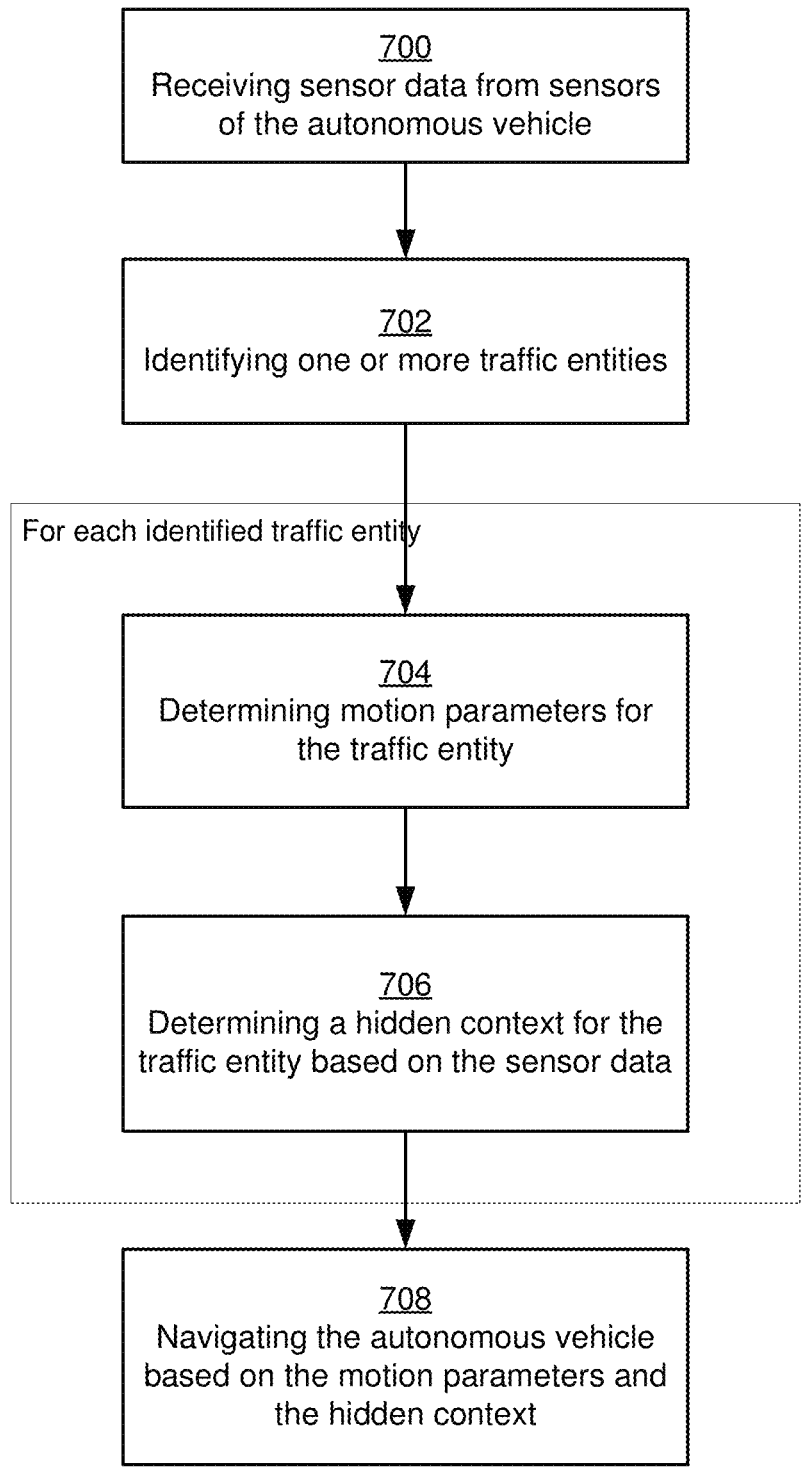
FIG. 7 represents a flowchart illustrating the process of navigating the autonomous vehicle based on hidden context, according to an embodiment.

FIG. 7 represents a flowchart illustrating the process of navigating the autonomous vehicle based on hidden context, according to an embodiment. The steps illustrated in the flowchart may be performed in an order different from that illustrated in FIG. 7. For example, certain steps may be performed in parallel. The steps may be performed by modules other than those indicated herein.

The vehicle computing system 120 receives 700 sensor data from sensors of the autonomous vehicle. For example, the vehicle computing system 120 may receive lidar scans from lidars and camera images from cameras mounted on the autonomous vehicle. In an embodiment, the vehicle computing system 120 builds a point cloud representation of the surroundings of the autonomous vehicle based on the sensor data. The point cloud representation includes coordinates of points surrounding the vehicle, for example, three dimensional points and parameters describing each point, for example, the color, intensity, and so on.

The vehicle computing system 120 identifies 702 one or more traffic entities based on the sensor data, for example, pedestrians, bicyclists, or other vehicles driving in the traffic. The traffic entities represent non-stationary objects in the surroundings of the autonomous vehicle.

In an embodiment, the autonomous vehicle obtains a map of the region through which the autonomous vehicle is driving. The autonomous vehicle may obtain the map from a server. The map may include a point cloud representation of the region around the autonomous vehicle. The autonomous vehicle performs localization to determine the location of the autonomous vehicle in the map and accordingly determines the stationary objects in the point cloud surrounding the autonomous vehicle. The autonomous vehicle may superimpose representations of traffic entities on the point cloud representation generated.

The vehicle computing system 120 repeats the following steps 704 and 706 for each identified traffic entity. The vehicle computing system 120 determines 704 motion parameters for the traffic entity, for example, speed and direction of movement of the traffic entity. The vehicle computing system 120 also determines 706 a hidden context associated with the traffic entity using the prediction engine 114.

The vehicle computing system 120 navigates 708 the autonomous vehicle based on the motion parameters as well as the hidden context. For example, the vehicle computing system 120 may determine a safe distance from the traffic entity that the autonomous vehicle should maintain based on the motion parameters of the traffic entity. The vehicle computing system 120 modulates the safe distance based on the hidden context. The vehicle computing system 120 may adjust the safe distance based on whether the near-term goal of the person indicating that the person intends to reach a location in the direction of the movement of the traffic entity or in a different direction.

For example, based on the motion parameters, the vehicle computing system 120 may determine that the autonomous vehicle can drive within X meters of the traffic entity. However, the hidden context indicates that the person represented by the traffic entity intends to cross the street in a direction different from the direction indicated by the motion parameters. In this situation, the vehicle computing system 120 adjusts the safe distance such that the autonomous vehicle is able to drive closer to the traffic entity than the distance X. On the other hand, if the hidden context indicates that the person represented by the traffic entity intends to cross the street in a direction same as the direction indicated by the motion parameters, the vehicle computing system 120 adjusts the safe distance such that the autonomous vehicle maintains a distance greater than X from the traffic entity.

In an embodiment, the vehicle computing system 120 further modulates the safe distance based on the distributional nature of model outputs. In an embodiment, the vehicle computing system 120 uses the kurtosis of the output distribution for modulating the safe distance. In cases where the kurtosis is very low, and the distribution approaches uniform, the vehicle computing system 120 determines that human uncertainty is high, thereby assigning a low measure of confidence in using the measurement of central tendency as the output. Accordingly, in this situation, the vehicle computing system increases the safe distance from the traffic entity by certain factor.

On the other hand, in cases with high kurtosis the vehicle computing system 120 determines a high measure of confidence indicating that the central tendency is likely to represent substantial human agreement that the output intention or awareness value accurately reflects the internal mental state of the detected human road user. In this situation the vehicle computing system may not increase the safe distance from the traffic entity or may increase it only by a small factor.

Accordingly, the factor by which the safe distance is increased is inversely proportionate to a measure of variation in the distribution of the predicted output. Accordingly, high variation in the distribution of the predicted values of the hidden context variables by human observers indicates low confidence in using the mean as the prediction and results in increasing the safe distance by a larger factor compared to situations in which the variation in the distribution of the predicted output is low indicating high confidence in using the mean as the prediction.

World Model Modulation

In a lattice planner-based autonomous driving stack, the world model modulation module 145 of the vehicle computing system 120 generates a world model from sensor data received by the sensors mounted on the autonomous vehicle. In an embodiment, the generated world model comprises one or more layers of perceptual inference about the state of the road around the vehicle. The world model modulation module 145 modulates the existing world model to make it more accurately represent the probabilistic likelihood of safe driving across the modeled grid.

The informational layer of a world model is an occupancy grid. An occupancy grid comprises a binary random variable for each point in a discretized topological rendering of the autonomous robot's local environment. The posterior estimate of occupancy at a given time step can be constructed with a Bayesian estimator that takes into account not just the outputs of depth sensitive sensors like LIDAR, but also semantically-aware estimates of minimum safe distance around moving agents (e.g., the maximum distance a human agent on foot can be expected to be able to move). When a vehicle is simulating proposed motion paths, the semantically-aware minimum safe distance estimates for moving agents can be biased by the output of the uncertainty-characterizing system. So, for instance, for a pedestrian with high intention, the minimum safe distance region would be stretched towards the current vehicle path and squeezed in other directions, preserving total area.

Figure 8:
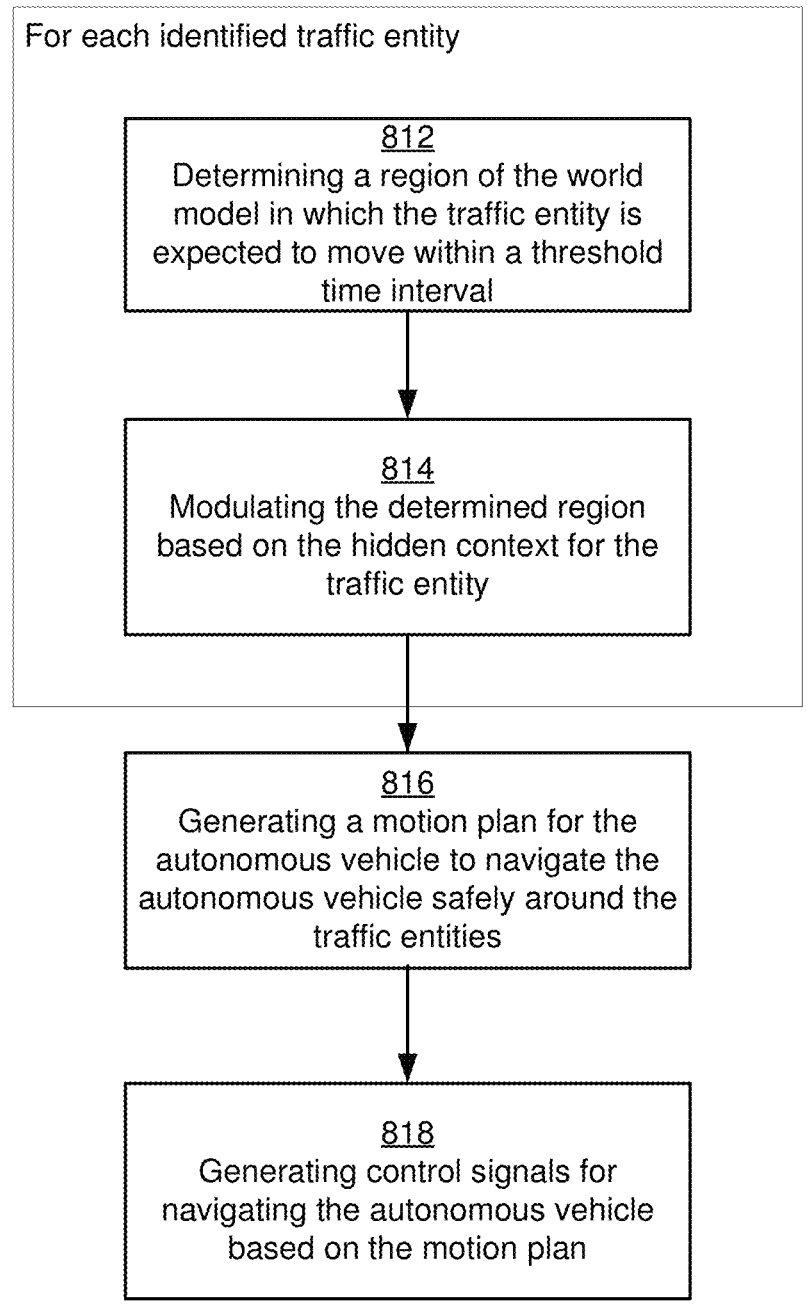
FIG. 8 represents a flowchart illustrating the process of modulating the world model for navigating the autonomous vehicle, according to an embodiment.

FIG. 8 represents a flowchart illustrating the process of modulating the world model for navigating 808 the autonomous vehicle, according to an embodiment. The vehicle computing system 120 repeats the steps 812 and 814 for each traffic entity identified. The future position estimator 125 of the vehicle computing system 120 estimates the future position of the traffic entity where the traffic entity is expected to move within a threshold time interval, for example, within the next few seconds. Accordingly, the vehicle computing system 120 determines 812 a region R of the world model in which the traffic entity is expected to move within the threshold time interval.

The future position estimator 125 in conjunction with the world model modulation module 145 modulates 814 the determined region R where the traffic entity is likely to move within the threshold time interval based on the hidden context. For example, if the hidden context indicates an intention of the person represented by the traffic entity to perform a task that requires the traffic entity to move in the direction D that was predicted by the future position estimator 125, the world model modulation module 145 further stretches the determined region R along the direction D. On the other hand, if the hidden context indicates an intention of the person represented by the traffic entity to perform a task that requires the traffic entity to move opposite to (or away from) the direction D that was predicted by the future position estimator 125, the world model modulation module 145 reduces the size of determined region R along the direction D. In an embodiment, the world model modulation module 145 modulates the region R so that the overall area of the region R remains substantially the same. For example, if the region R is stretched along a particular direction, the region R is made thin along other directions, thereby preserving the overall area of the region R.

The motion planner 130 generates 816 a motion plan for the autonomous vehicle to navigate the autonomous vehicle safely around the traffic entities. For example, the motion planner 130 generates 816 a motion plan that makes sure that the autonomous vehicle travels such that it does not get within a safe threshold distance of any traffic entity.

The vehicle control module 135 generates 818 control signals for navigating the autonomous vehicle based on the motion plan. For example, the vehicle control module 135 may control the direction of the vehicle in accordance with the motion plan. The vehicle control module 135 may also slow down the autonomous vehicle or accelerate the autonomous vehicle to ensure that the autonomous vehicle does not get within a safe threshold distance of any traffic entity.

The vehicle computing system determines the amount by which the region R is modulated based on the hidden context values. The vehicle computing system may also determine the amount by which the region R is modulated based on the distributional nature of model outputs. In an embodiment, the vehicle computing system 120 determines the amount by which the region R is modulated based on the kurtosis of the output distribution used as a tuning parameter that represents uncertainty.

In cases where the kurtosis is very low, and the distribution approaches uniform, the vehicle computing system 120 determines that human uncertainty is high, and a measurement of central tendency would not be useful for prediction, thereby assigning a low measure of confidence in using the measurement of central tendency as the output for determining the amount by which the region R is modulated. On the other hand, in cases with high kurtosis the vehicle computing system 120 determines a high measure of confidence indicating that the central tendency is likely to represent substantial human agreement that the output intention or awareness value accurately reflects the internal mental state of the detected human road user. The vehicle computing system 120 determines the amount by which the region R is modulated based on the measure of confidence. In an embodiment, the vehicle computing system 120 modulates the region by a larger factor if measure of confidence in the predicted output is low and modulates the region by a smaller factor if the measure of confidence in the predicted output is high.

The measure of confidence in a predicted output may be determined using various statistical measures. In an embodiment, the vehicle computing system 120 determines a mean and a variance measures for the distribution of the output values. The vehicle computing system 120 determines high confidence in predicting the output as the mean value if the variance is low, thereby indicating high certainty in the prediction. Similarly, vehicle computing system 120 determines low confidence in predicting the output as the mean value if the variance is high, thereby indicating low certainty in the prediction. The vehicle computing system 120 determines the amount by which the region R is modulated as a factor that is directly related to the measure of confidence in the predicted output value. Accordingly, if the vehicle computing system 120 determines a high measure of confidence, the vehicle computing system 120 modulates the region R by a high factor. Similarly, if the vehicle computing system 120 determines a low measure of confidence, the vehicle computing system 120 modulates the region R by a smaller factor.

False Positive Reduction

In autonomous vehicles and advance driver-assistance systems in which the driver is in control, the vehicle computing system 120 uses modulatory signals based on hidden context to reduce false positives. For instance, in the case of a braking system such as an automatic emergency braking (AEB) system, the vehicle computing system 120 modulates the activation threshold for the braking system based on a weighted linear combination of model outputs predicting estimates of values for hidden context attributes.

The vehicle computing system 120 determines the activation threshold for the emergency braking system based on the certainty of evidence required before brakes are applied. The vehicle computing system 120 determines the activation threshold for the emergency braking system to be higher in cases where the vehicle computing system 120 determines hidden context attributes with high certainty, e.g., hidden context attribute indicating whether the pedestrian in the roadway intended to cross the street or whether a bicyclist was aware of the vehicle. The vehicle computing system 120 adjusts the activation threshold to effectively remove or reduce false positive emergency braking scenarios, for example when a pedestrian enters the roadway for reasons other than intending to cross the road.

As an example, if the vehicle computing system 120 determines with a very high certainty that a pedestrian does not intend to cross the street, the vehicle computing system 120 adjusts the weightings and thresholds to decrease the likelihood of initiating the emergency breaking system when the pedestrian walks towards the street. On the other hand, if the vehicle computing system 120 determines with a very low certainty that the pedestrian does not intend to cross the street, the vehicle computing system 120 adjusts the weightings and thresholds to increase the likelihood of initiating the emergency breaking system if the pedestrian walks towards the street.

Figure 9:
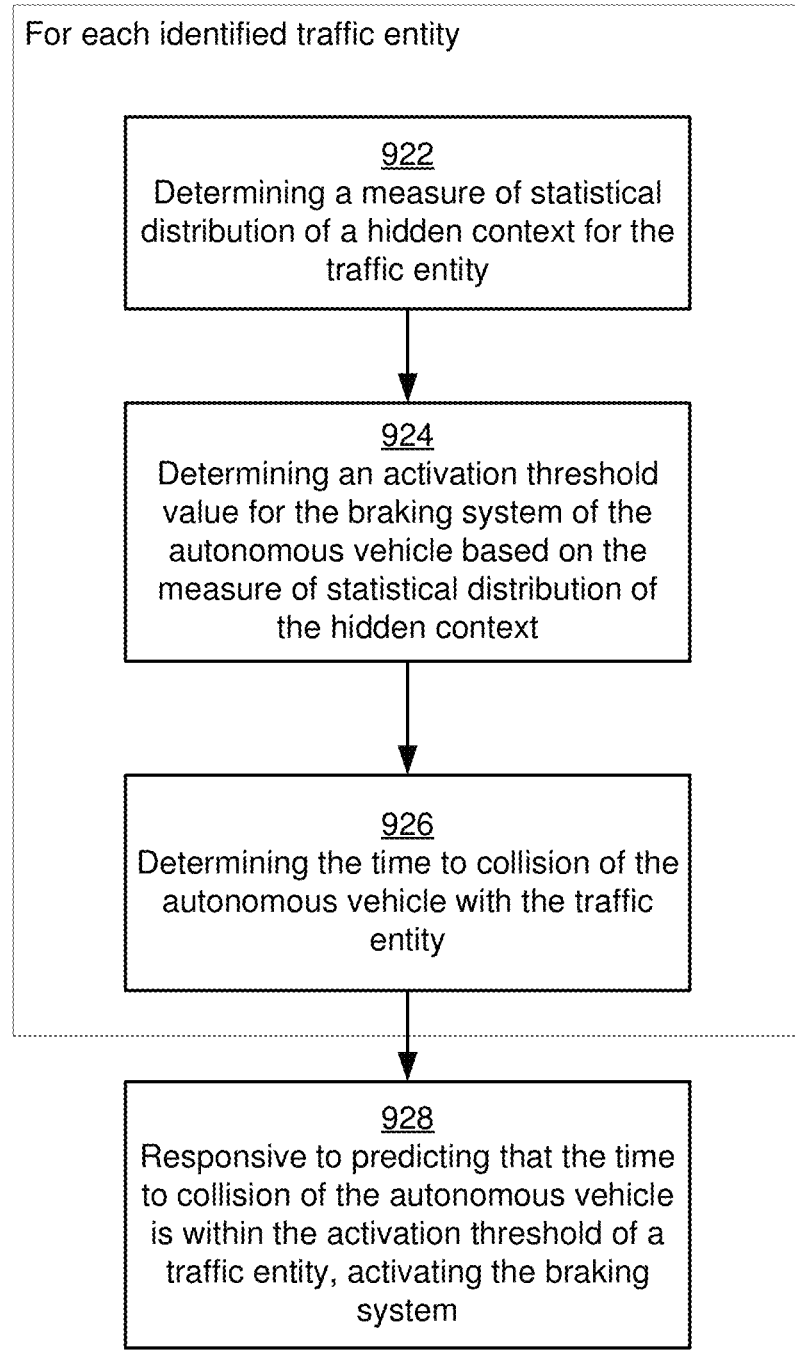
FIG. 9 represents a flowchart illustrating the process of using the modulatory signals to reduce false positives while navigating the autonomous vehicle, according to an embodiment.

FIG. 9 represents a flowchart illustrating the process of using the modulatory signals to reduce false positives while navigating the autonomous vehicle, according to an embodiment. The vehicle computing system 120 performs the steps 922 and 924 for each traffic entity identified. The vehicle computing system 120 determines 922 a measure of statistical distribution of a hidden context for the traffic entity. In an embodiment, the prediction engine 114 executes a machine learning based model (e.g., a neural network) that predicts distribution associated with hidden context, for example, mean and variance of a likelihood that a person represented by a traffic entity wants to cross the street. The vehicle computing system 120 determines 924 an activation threshold value for the braking system of the autonomous vehicle based on the measure of statistical distribution of the hidden context. In an embodiment, the activation threshold represents a threshold time to collision between the traffic entity and the vehicle. Accordingly, if the vehicle computing system 120 determines that the time to collision with a traffic entity is below the activation threshold, the vehicle computing system 120 activates emergency brakes of the autonomous vehicle.

The vehicle computing system 120 periodically predicts the time to collision for each traffic entity. If the vehicle computing system 120 determines 926 at any point in time that the time to collision of the autonomous vehicle within the activation threshold of a traffic entity, the vehicle computing system 120 activates the braking system.

The vehicle computing system 120 uses lower activation thresholds if the model outputs indicate higher uncertainty in values of hidden context attributes, for example, estimates of state of mind of a user represented by a traffic entity or estimates of degree of awareness of information such as the presence of the autonomous vehicle in the mind of a user represented by a traffic entity. Accordingly, in situations where the hidden context attribute indicates a high degree of uncertainty indicating a likelihood of a collision, the vehicle computing system 120 is more likely to initiate emergency maneuvers than in situations where the hidden context attribute is determined with lower certainty indicating a likelihood of collision.

In an embodiment, the weightings and the amount of threshold modulation is set by a user. In other embodiments, the weightings and the amount of threshold modulation is adjusted based on simulation results. Accordingly, different weightings and threshold values are set and the results of navigation of an autonomous vehicle are determined based on simulation of traffic. The weightings and amounts of threshold values are adjusted, so as to minimize the likelihood of collision as well as provide a driving experience close to the driving experience when a human is driving the vehicle. In an embodiment, the results of simulation are provided to an expert for evaluation, for example, to rank the driving experience from the perspective of a human.

An additional tuning parameter that is used by the vehicle computing system 120 is the distributional nature of model outputs. The models of the prediction engine 114 predict the distributional characteristics of human responses to the presented video/image of traffic scenario comprising one or more traffic entities. In an embodiment, the vehicle computing system 120 uses the kurtosis of the output distribution as a tuning parameter that represents uncertainty for adjusting the activation thresholds of the AEB system. Accordingly, the vehicle computing system 120 determines the value of an activation threshold of the AEB system based on the kurtosis of the output distribution of the machine learning based model.

In cases where the kurtosis is very low, and the distribution approaches uniform, the vehicle computing system 120 determines that human uncertainty is high, and a measurement of central tendency would not be useful for prediction, thereby assigning a low measure of confidence in using the measurement of central tendency as the output. On the other hand, in cases with high kurtosis the vehicle computing system 120 determines a high measure of confidence indicating that the central tendency is likely to represent substantial human agreement that the output intention or awareness value accurately reflects the internal mental state of the detected human road user. The vehicle computing system 120 determines the activation thresholds for AEB based on the measure of confidence. In an embodiment, the vehicle computing system 120 uses low activation thresholds for the braking mechanism if the measure of confidence in the predicted output is low and high activation thresholds for the braking mechanism if the measure of confidence in the predicted output is high.

In some situations, the kurtosis of the output distribution is very low, and kurtosis value indicates that the distribution approaches uniform. In these situations, the vehicle computing system 120 determines a low measure of confidence in a specific value of output representing the central tendency. Accordingly, in these situations the vehicle computing system 120 uses low activation thresholds. This is so because in this situation, the human uncertainty is determined to be high, and a measurement of central tendency is not useful for prediction.

On the other hand, in some situations the kurtosis of the output distribution is high. In these situations, the vehicle computing system 120 determines a high measure of confidence in a specific value of output representing the central tendency. Accordingly, in these situations the vehicle computing system 120 uses high activation thresholds since the central tendency is likely to represent substantial human agreement that the output intention or awareness value accurately reflects the hidden context value, for example, the internal mental state of a detected human road user.

The measure of confidence in a predicted output may be determined using various statistical measures. In an embodiment, the vehicle computing system 120 determines a mean and a variance measures for the distribution of the output values. The vehicle computing system 120 determines high confidence in predicting the output as the mean value if the variance is low, thereby indicating high certainty in the prediction. Similarly, vehicle computing system 120 determines low confidence in predicting the output as the mean value if the variance is high, thereby indicating low certainty in the prediction. The vehicle computing system 120 determines the value of the activation threshold as a value that is directly related to the measure of confidence in the predicted output value. Accordingly, if the vehicle computing system 120 determines a high measure of confidence, the vehicle computing system 120 determines a high value of the activation threshold. Similarly, if the vehicle computing system 120 determines a low measure of confidence, the vehicle computing system 120 determines a low value of the activation threshold.

A high value of activation threshold indicates that the vehicle is less likely to engage the automatic braking system and apply brakes within a distance of a traffic entity compared to a low value of activation threshold. A low value of activation threshold indicates that the vehicle is more likely to engage the automatic braking system and apply brakes within a distance of a traffic entity compared to a high value of activation threshold.

Figure 10:
FIG. 10 illustrates sensor data captured by the autonomous vehicle illustrating traffic entities, according to an embodiment.
Figure 12:
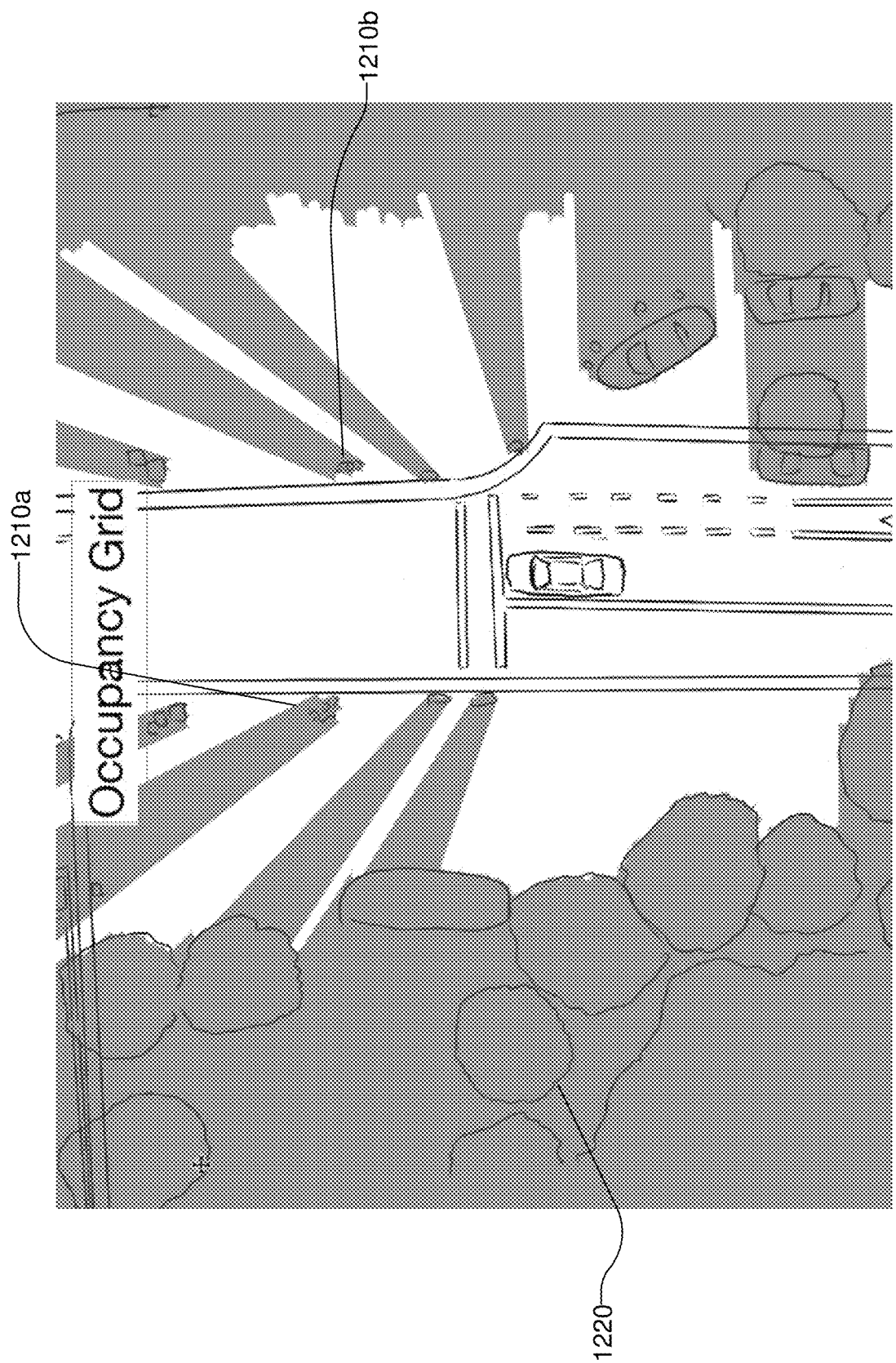
FIG. 12 illustrates an occupancy grid representation of objects surrounding the autonomous vehicle, according to an embodiment.

FIG. 10 illustrates sensor data captured by the autonomous vehicle illustrating traffic entities, according to an embodiment. The sensor data may be captured by various sensors such as camera, lidar, infrared sensors, and so on. In an embodiment, the vehicle computing system 120 captures sensor data from a plurality of sensors and combines the sensor data to build a representation of the surroundings of the autonomous vehicle, for example, a point cloud representation. The vehicle computing system 120 identifies one or more traffic entities 1010a, 1010b, 1010c, for further analysis. The vehicle computing system 120 selects traffic entities that are capable of moving through the traffic, for example, pedestrians, bicyclists, or any other vehicle that is driving in the traffic. In an embodiment, the vehicle computing system 120 uses machine learning based models configured to recognize objects in an image/sensor data to identify traffic entities for further analysis. FIG. 12 shows a representation of the sensor data that is annotated with information 1020a, 1020b, 1020c derived from the raw sensor data.

Figure 11:
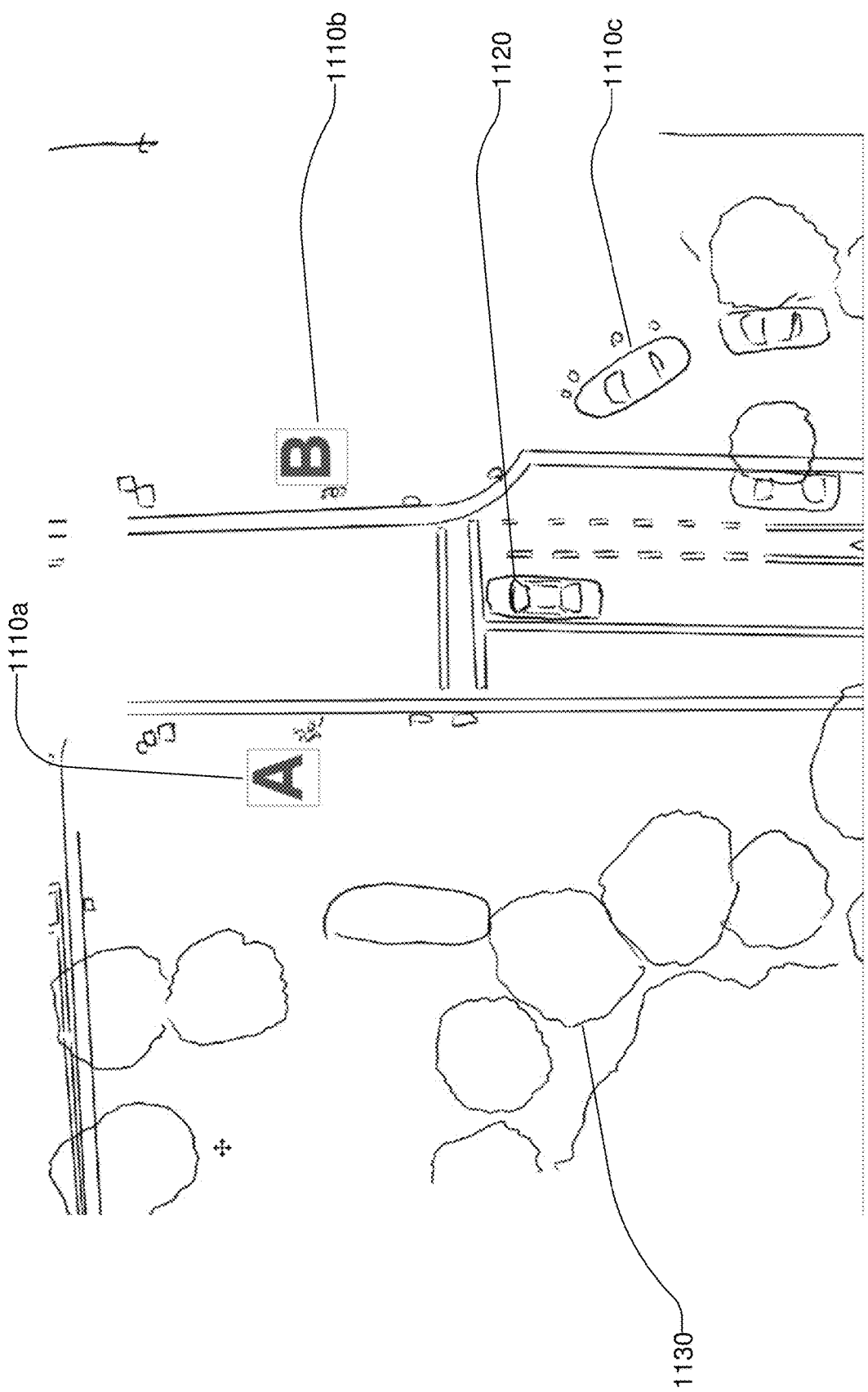
FIG. 11 illustrates various objects surrounding the autonomous vehicle, according to an embodiment.

FIG. 11 illustrates various objects surrounding the autonomous vehicle, according to an embodiment. FIG. 11 represents a bird's eye view of the objects surrounding the autonomous vehicle 1120. There are several traffic entities 1110a, 1110b, 1110c, that are around the autonomous vehicle 1120. There may be objects that are stationary, for example, trees 1130. The vehicle computing system 120 identifies traffic entities that represents objects in the traffic that are likely to move. The traffic entities A and B shown in FIG. 11 correspond to pedestrians 1210a and 1220b respectively.

FIG. 12 illustrates an occupancy grid representation of objects surrounding the autonomous vehicle, according to an embodiment. The occupancy grid represents the surroundings of the autonomous vehicle using three dimensional (3D) points. The occupancy grid allows determination of areas where there are objects filling the space surrounding the autonomous vehicle. The 3D point may be determined based on sensor data that includes a depth of each object, for example, lidar scan. The occupancy grid represents all data points that are within line of sight of the sensors of the autonomous vehicle. The occupancy grid does not include representations of objects such as object 1220 that is occluded by other objects and therefore not visible from the autonomous vehicle. The occupancy grid representation includes sets 1210a, 1210b of data points corresponding to the traffic entities 1210a, 1210b.

Figure 13:
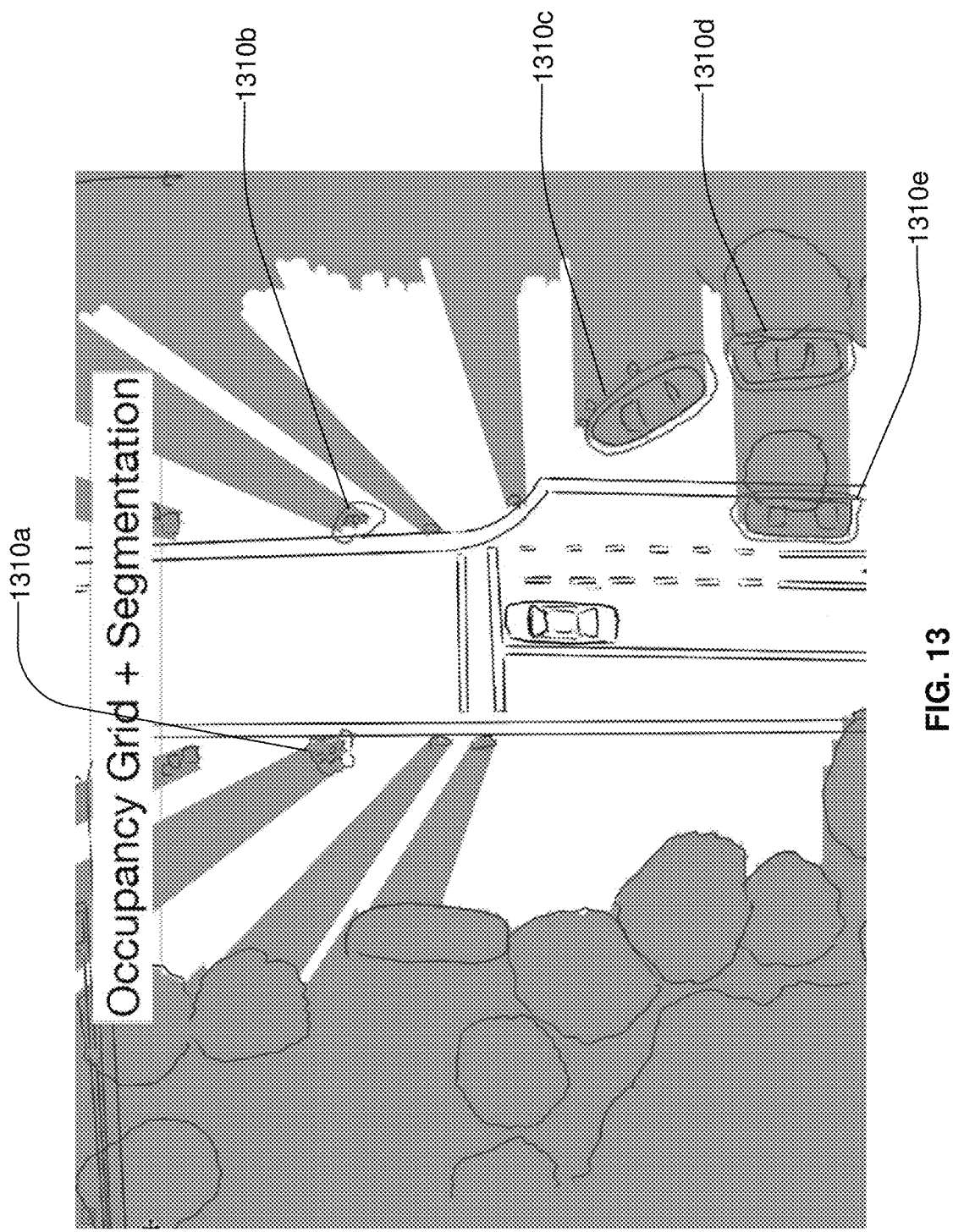
FIG. 13 illustrates segmentation of various traffic entities in the occupancy grid representation of the surroundings of the autonomous vehicle, according to an embodiment.

FIG. 13 illustrates segmentation of various traffic entities in the occupancy grid representation of the surroundings of the autonomous vehicle, according to an embodiment. The vehicle computing system 120 identifies non-stationary objects 1310 in the occupancy grid representation, i.e., objects in the surrounding of the vehicle that are likely to move, for example, traffic entities 1210a, 1210b. In an embodiment, the vehicle computing system 120 provides the occupancy grid representation as input to a machine learning based model configured to predict a likelihood of an object in the traffic to move.

Figure 14:
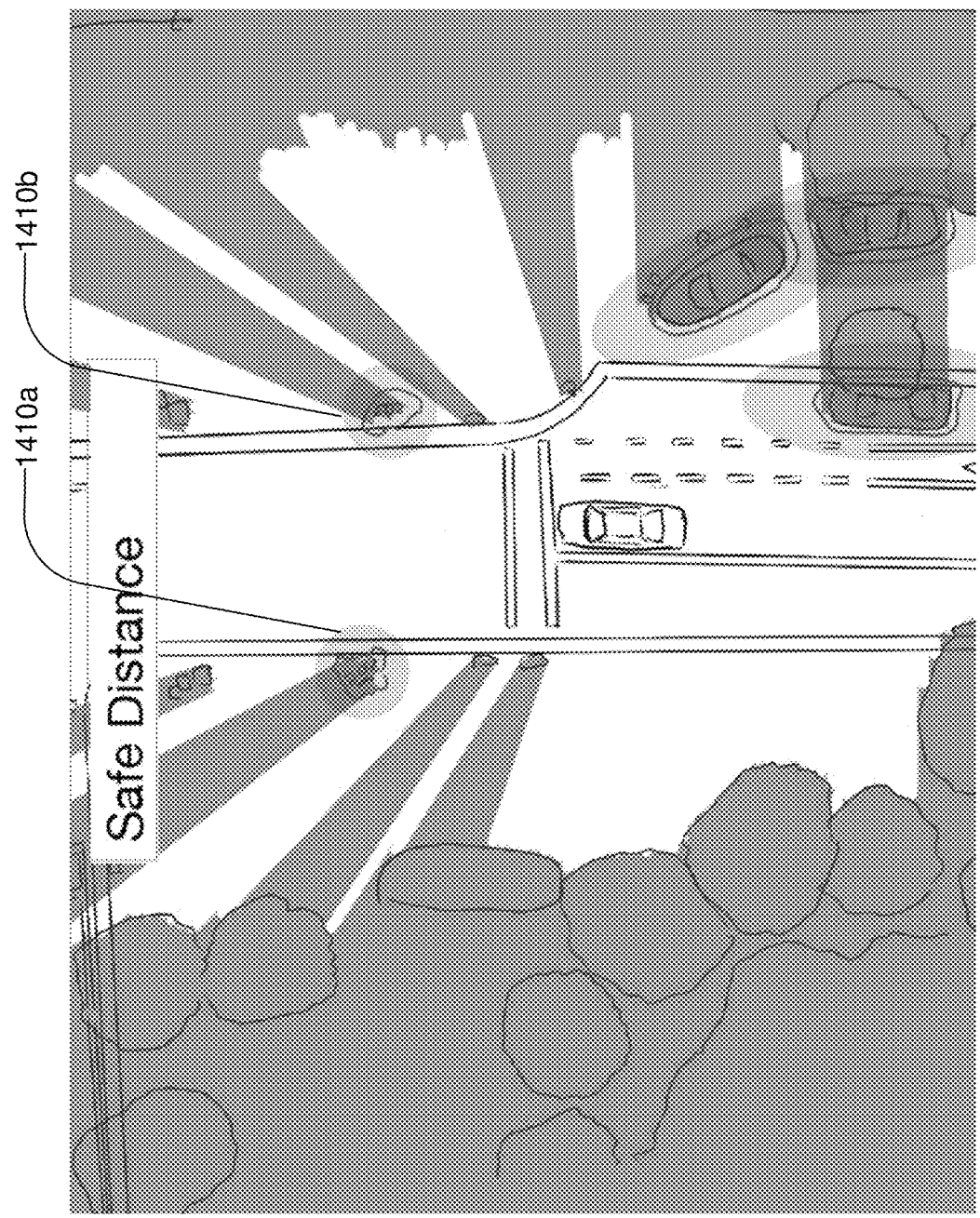
FIG. 14 illustrates determination of safe distance from traffic entities while navigating through the traffic by the autonomous vehicle, according to an embodiment.

FIG. 14 illustrates determination of safe distance from traffic entities while navigating through the traffic by the autonomous vehicle, according to an embodiment. In an embodiment, the vehicle computing system 120 determines a region 1410a, 1410b around each selected traffic entity that the autonomous vehicle needs to avoid in order to drive safely. In an embodiment, the vehicle computing system 120 the region around a traffic entity based on known characteristics of the traffic entity, for example, based on a typical speed of a traffic entity of that type (pedestrian, bicyclist, and so on).

Figure 15:
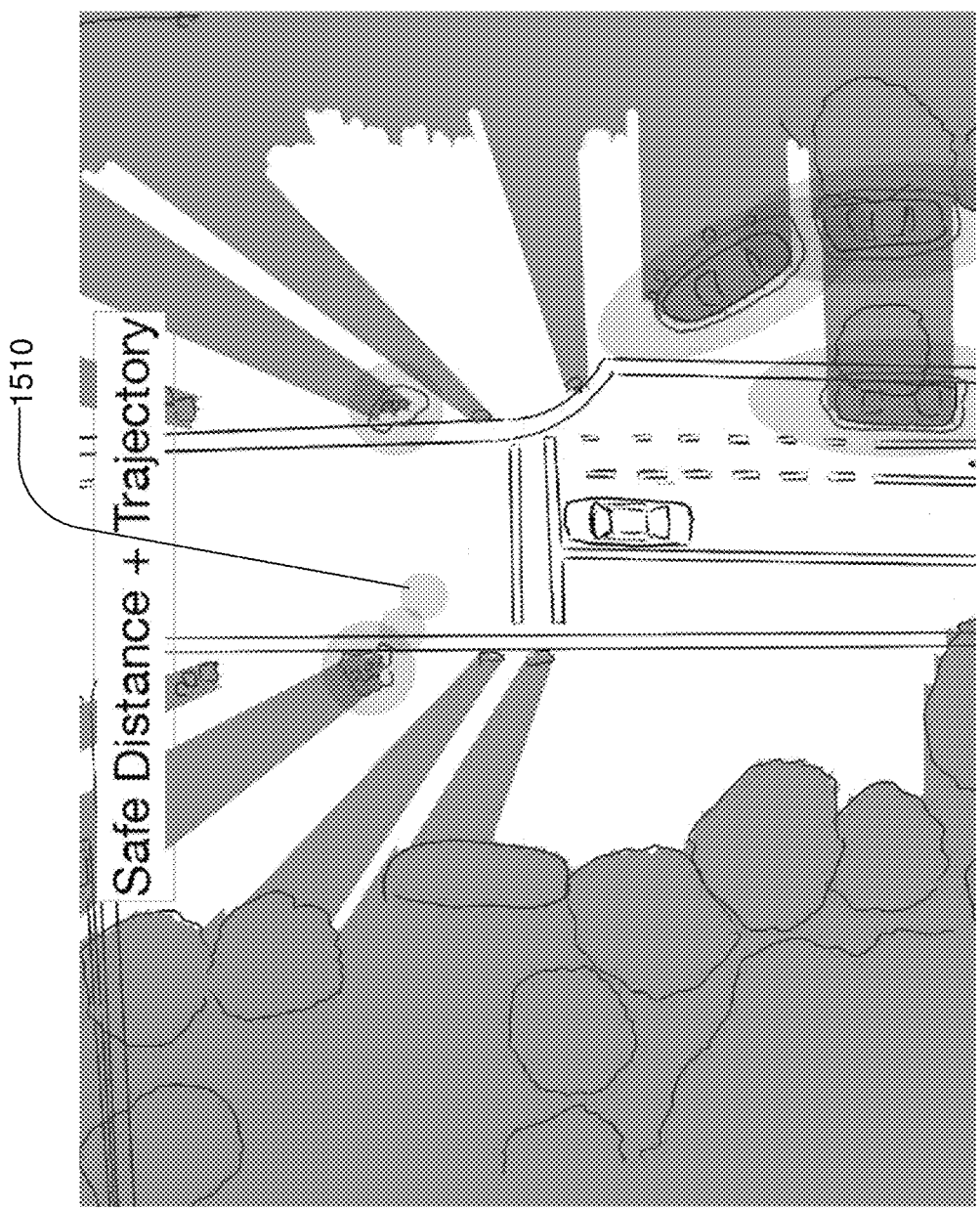
FIG. 15 illustrates determination of safe distance based on trajectory of traffic entities, according to an embodiment.

FIG. 15 illustrates determination of safe distance based on trajectory of traffic entities, according to an embodiment. The vehicle computing system 120 further determines motion parameters of the traffic entity, for example, motion parameters representing the speed and direction in which the traffic entity is moving. The vehicle computing system 120 determines additional regions 1510 based on the trajectory of the traffic entity. These regions represent regions that the traffic entity could reach given its current trajectory. Accordingly, the autonomous vehicle needs to avoid these regions 1510 while navigating through the traffic.

Figure 16:
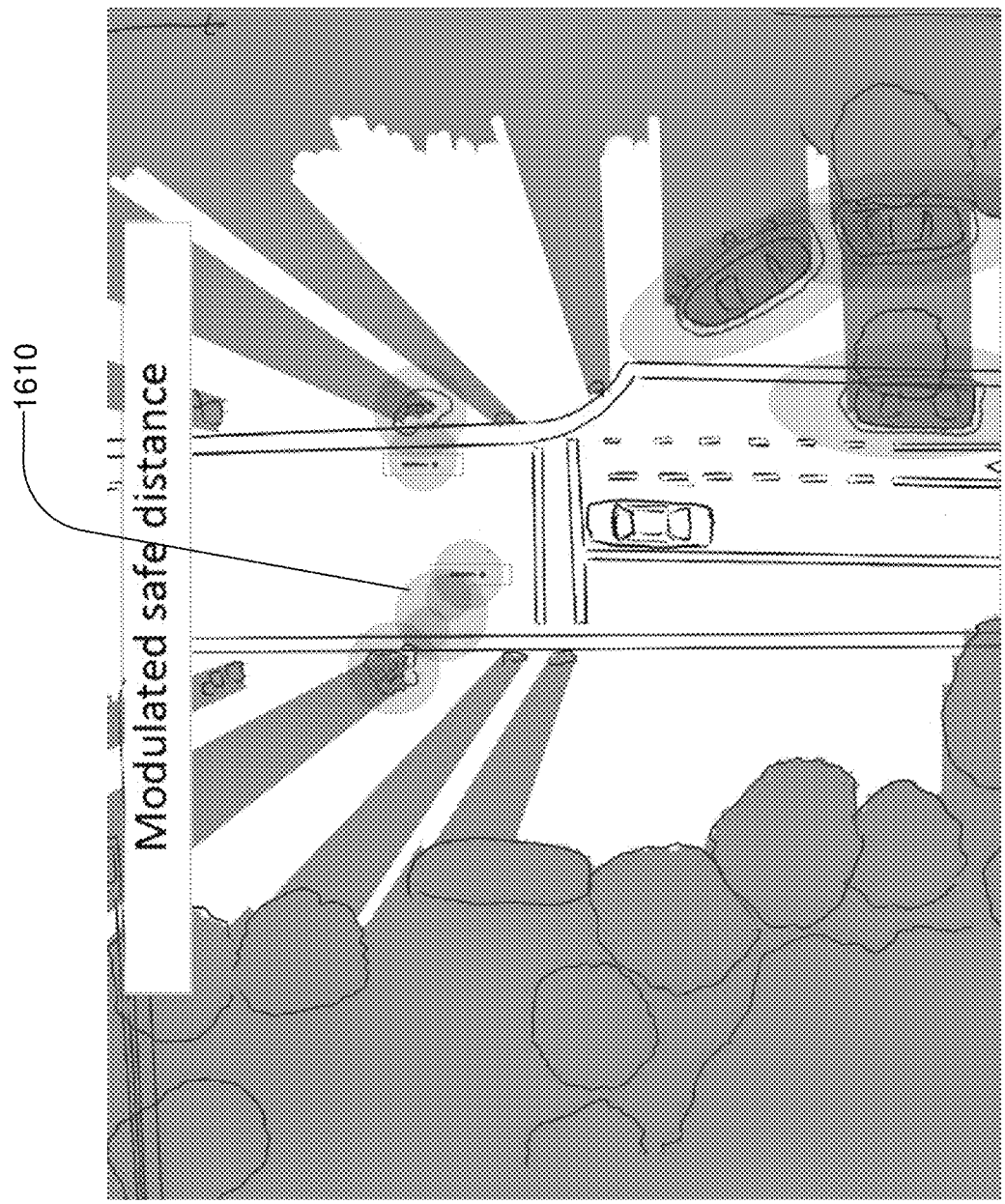
FIG. 16 illustrates modulation of safe distance based on predicted hidden context associated with traffic entities, according to an embodiment.

FIG. 16 illustrates modulation of safe distance based on predicted hidden context associated with traffic entities, according to an embodiment. The vehicle computing system 120 determines a hidden context for each traffic entity based on the prediction engine 114. The hidden context may represent a state of mind of a person represented by the traffic entity, for example, a pedestrian. The hidden context may represent a near term goal of the person represented by the traffic entity, for example, indicating that the pedestrian has the goal to get to the other side of the street or the pedestrian has the goal to pick up an object (say a wallet) that the pedestrian dropped on the street. The vehicle computing system 120 determines regions 1610 representing a modulated safe distance. The regions 1610 are determined based on the motion parameters of the traffic entity as well as hidden context associated with the traffic entity determined using the prediction engine 114.

Computing Machine Architecture

Figure 17:
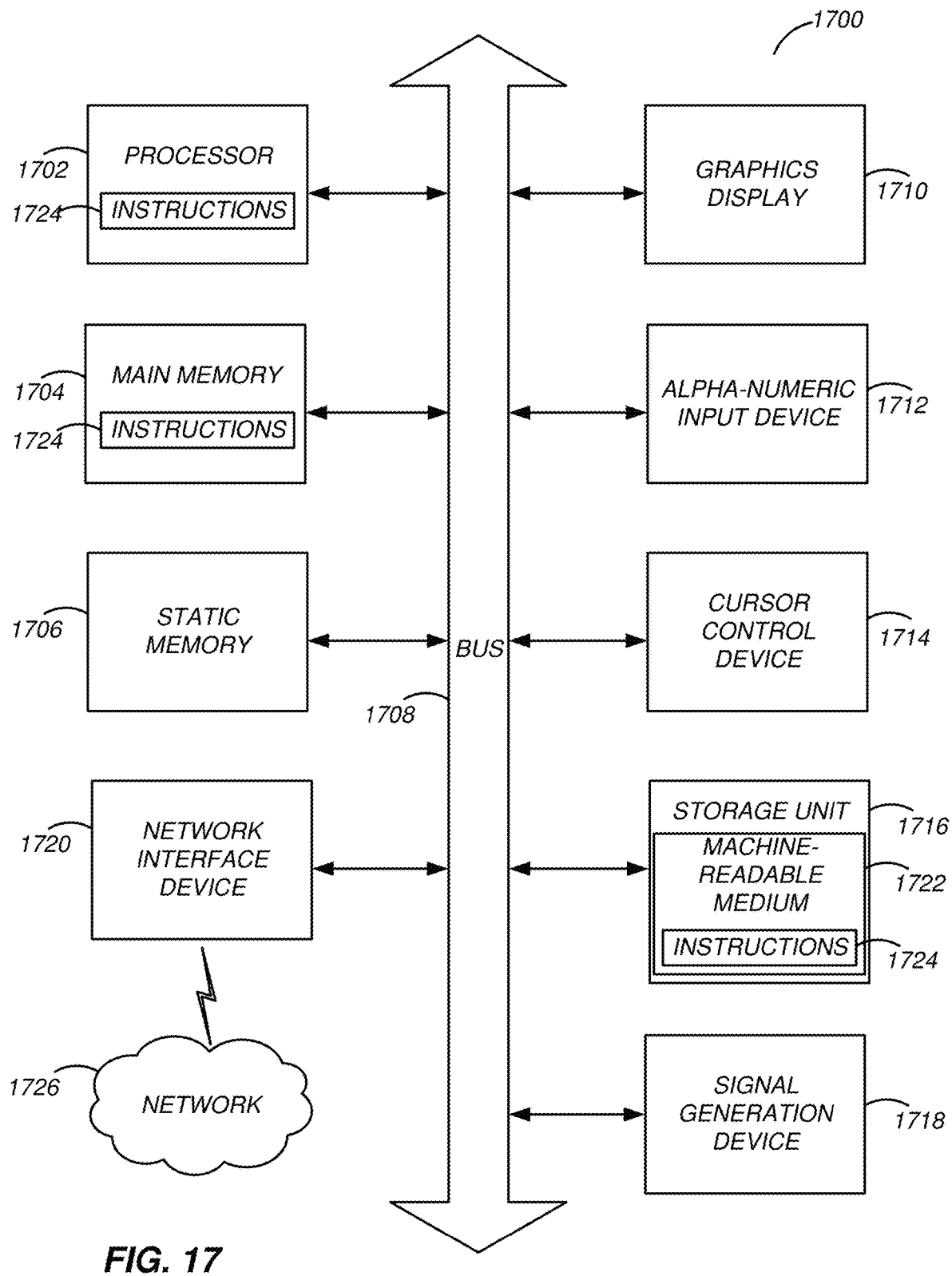
FIG. 17 is a block diagram illustrating components of an example machine able to read instructions from a machine-readable medium and execute them in a processor (or controller).

FIG. 17 is a block diagram illustrating components of an example machine able to read instructions from a machine-readable medium and execute them in a processor (or controller). Specifically, FIG. 17 shows a diagrammatic representation of a machine in the example form of a computer system 1700 within which instructions 1724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1724 (sequential or otherwise) that specify actions to be taken by that machine. Further, while only a single machine is illustrated, the term "machine" shall also be taken to include any collection of machines that individually or jointly execute instructions 1724 to perform any one or more of the methodologies discussed herein.

The example computer system 1700 includes a processor 1702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1704, and a static memory 1706, which are configured to communicate with each other via a bus 1708. The computer system 1700 may further include graphics display unit 1710 (e.g., a plasma display panel (PDP), a liquid crystal display (LCD), a projector, or a cathode ray tube (CRT)). The computer system 1700 may also include alphanumeric input device 1712 (e.g., a keyboard), a cursor control device 1714 (e.g., a mouse, a trackball, a joystick, a motion sensor, or other pointing instrument), a storage unit 1716, a signal generation device 1718 (e.g., a speaker), and a network interface device 1720, which also are configured to communicate via the bus 1708.

The storage unit 1716 includes a machine-readable medium 1722 on which is stored instructions 1724 (e.g., software) embodying any one or more of the methodologies or functions described herein. The instructions 1724 (e.g., software) may also reside, completely or at least partially, within the main memory 1704 or within the processor 1702 (e.g., within a processor's cache memory) during execution thereof by the computer system 1700, the main memory 1704 and the processor 1702 also constituting machine-readable media. The instructions 1724 (e.g., software) may be transmitted or received over a network 1726 via the network interface device 1720.

While machine-readable medium 1722 is shown in an example embodiment to be a single medium, the term "machine-readable medium" should be taken to include a single medium or multiple media (e.g., a centralized or distributed database, or associated caches and servers) able to store instructions (e.g., instructions 1724). The term "machine-readable medium" shall also be taken to include any medium that is capable of storing instructions (e.g., instructions 1724) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Although embodiments disclosed describe techniques for navigating autonomous vehicles, the techniques disclosed are applicable to any mobile apparatus, for example, a robot, a delivery vehicle, a drone, and so on.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

I claim:

1. A method comprising:
receiving, by an autonomous vehicle, sensor data from sensors mounted on the autonomous vehicle, the sensor data comprising one or more images;
generating a point cloud representation of the surroundings of the autonomous vehicle based on the sensor data;
identifying, one or more traffic entities based on the sensor data, the traffic entities representing non-stationary objects in traffic in which the autonomous vehicle is driving;
for each of the one or more traffic entities:
determining one or more motion parameters describing movement of the traffic entity;
providing an image of the one or more images, the image showing the traffic entity as input to a machine learning model configured to receive an input image showing an input traffic entity and output summary statistics of expected human responses describing a hidden context of the input traffic entity shown in the input image;
determining the hidden context of the traffic entity based on the output of the machine learning based model;
determining a region of the point cloud where the traffic entity is expected to reach within a threshold time interval; and
modifying the region based on the hidden context of the traffic entity; and
navigating the autonomous vehicle so that the autonomous vehicle stays at least a threshold distance away from the modified region of each of the one or more traffic entities.

2. The method of claim 1, wherein the region is in a direction determined based on a motion vector of the traffic entity, wherein the traffic entity represents a user, wherein modifying the region based on the hidden context comprises:
responsive to determining based on the hidden context that the user represented by the traffic entity is likely to move in the direction having a component along the motion vector, extending the region along the direction of the motion vector.

3. The method of claim 1, wherein the region is in a direction determined based on a motion vector of the traffic entity, wherein the traffic entity represents a user, wherein modifying the region based on the hidden context comprises:
responsive to determining based on the hidden context that the user represented by the traffic entity is likely to move in a direction having a component opposite to direction of the motion vector, decreasing a size of the region along the direction of the motion vector.

4. The method of claim 1, wherein the hidden context represents a state of mind of a user represented by the traffic entity.

5. The method of claim 1, wherein the hidden context represents a task that a user represented by the traffic entity is planning on accomplishing.

6. The method of claim 1, wherein the hidden context represents a degree of awareness of the autonomous vehicle by a user represented by the traffic entity.

7. The method of claim 1, wherein the hidden context represents a goal of a user represented by the traffic entity, wherein the user expects to achieve the goal within a threshold time interval.

8. The method of claim 1, wherein navigating the autonomous vehicle comprises:
generating signals for controlling the autonomous vehicle based on the one or more motion parameters and the hidden context of each of the one or more traffic entities; and
sending the generated signals to controls of the autonomous vehicle.

9. The method of claim 1, wherein the sensor data represents one or more images captured by a camera mounted on the autonomous vehicle or a lidar scan captured by a lidar mounted on the autonomous vehicle.

10. A non-transitory computer readable storage medium storing instructions, that when executed by a processor, cause the processor to perform steps comprising:
receiving, by an autonomous vehicle, sensor data from sensors mounted on the autonomous vehicle, the sensor data comprising one or more images;
generating a point cloud representation of the surroundings of the autonomous vehicle based on the sensor data;
identifying, one or more traffic entities based on the sensor data, the traffic entities representing non-stationary objects in traffic in which the autonomous vehicle is driving;
for each of the one or more traffic entities:
determining one or more motion parameters describing movement of the traffic entity;
providing an image of the one or more images, the image showing the traffic entity as input to a machine learning model configured to receive an input image showing an input traffic entity and output summary statistics of expected human responses describing a hidden context of the input traffic entity shown in the input image;
determining the hidden context of the traffic entity based on the output of the machine learning based model;
determining a region of the point cloud where the traffic entity is expected to reach within a threshold time interval; and
modifying the region based on the hidden context of the traffic entity; and
navigating the autonomous vehicle so that the autonomous vehicle stays at least a threshold distance away from the modified region of each of the one or more traffic entities.

11. The non-transitory computer readable storage medium of claim 10, wherein the region is in a direction determined based on a motion vector of the traffic entity, wherein the traffic entity represents a user, wherein modifying the region based on the hidden context comprises:
responsive to determining based on the hidden context that the user represented by the traffic entity is likely to move in the direction having a component along the motion vector, extending the region along the direction of the motion vector.

12. The non-transitory computer readable storage medium of claim 10, wherein the region is in a direction determined based on a motion vector of the traffic entity, wherein the traffic entity represents a user, wherein modifying the region based on the hidden context comprises:
responsive to determining based on the hidden context that the user represented by the traffic entity is likely to move in a direction having a component opposite to direction of the motion vector, decreasing a size of the region along the direction of the motion vector.

13. The non-transitory computer readable storage medium of claim 10, wherein the hidden context represents a state of mind of a user represented by the traffic entity.

14. The non-transitory computer readable storage medium of claim 10, wherein the hidden context represents a task that a user represented by the traffic entity is planning on accomplishing.

15. The non-transitory computer readable storage medium of claim 10, wherein the hidden context represents a degree of awareness of the autonomous vehicle by a user represented by the traffic entity.

16. The non-transitory computer readable storage medium of claim 10, wherein the hidden context represents a goal of a user represented by the traffic entity, wherein the user expects to achieve the goal within a threshold time interval.

17. The non-transitory computer readable storage medium of claim 10, wherein navigating the autonomous vehicle comprises:
generating signals for controlling the autonomous vehicle based on the one or more motion parameters and the hidden context of each of the one or more traffic entities; and
sending the generated signals to controls of the autonomous vehicle.

18. The non-transitory computer readable storage medium of claim 10, wherein the sensor data represents one or more images captured by a camera mounted on the autonomous vehicle or a lidar scan captured by a lidar mounted on the autonomous vehicle.

19. A computer system comprising:
a processor; and
a non-transitory computer readable storage medium storing instructions that when executed by the processor, cause the processor to perform steps comprising:
receiving, by an autonomous vehicle, sensor data from sensors mounted on the autonomous vehicle, the sensor data comprising one or more images;
generating a point cloud representation of the surroundings of the autonomous vehicle based on the sensor data;
identifying, one or more traffic entities based on the sensor data, the traffic entities representing non-stationary objects in traffic in which the autonomous vehicle is driving;
for each of the one or more traffic entities:
determining one or more motion parameters describing movement of the traffic entity;
providing an image of the one or more images, the image showing the traffic entity as input to a machine learning model configured to receive an input image showing an input traffic entity and output summary statistics of expected human responses describing a hidden context of the input traffic entity shown in the input image;
determining the hidden context of the traffic entity based on the output of the machine learning based model;
determining a region of the point cloud where the traffic entity is expected to reach within a threshold time interval; and
modifying the region based on the hidden context of the traffic entity; and
navigating the autonomous vehicle so that the autonomous vehicle stays at least a threshold distance away from the modified region of each of the one or more traffic entities.

20. The computer system of claim 19, wherein the region is in a direction determined based on a motion vector of the traffic entity, wherein the traffic entity represents a user, wherein modifying the region based on the hidden context comprises:
    responsive to determining based on the hidden context that the user represented by the traffic entity is likely to move in the direction having a component along the motion vector, extending the region along the direction of the motion vector.

21. The computer system of claim 19, wherein the region is in a direction determined based on a motion vector of the traffic entity, wherein the traffic entity represents a user, wherein modifying the region based on the hidden context comprises:
    responsive to determining based on the hidden context that the user represented by the traffic entity is likely to move in a direction having a component opposite to direction of the motion vector, decreasing a size of the region along the direction of the motion vector.

22. The computer system of claim 19, wherein the hidden context represents a state of mind of a user represented by the traffic entity.

23. The computer system of claim 19, wherein the hidden context represents a degree of awareness of the autonomous vehicle by a user represented by the traffic entity.

* * * * *